United States Patent
Yao et al.

(10) Patent No.: US 12,192,085 B2
(45) Date of Patent: Jan. 7, 2025

(54) SYSTEMS, METHODS, AND DEVICES FOR END-TO-END MEASUREMENTS AND PERFORMANCE DATA STREAMING

(71) Applicant: APPLE INC., Cupertino, CA (US)

(72) Inventors: Yizhi Yao, Chandler, AZ (US); Joey Chou, Scottsdale, AZ (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/475,407

(22) Filed: Sep. 27, 2023

(65) Prior Publication Data

US 2024/0022490 A1    Jan. 18, 2024

Related U.S. Application Data

(62) Division of application No. 17/276,406, filed as application No. PCT/US2019/051932 on Sep. 19, 2019.

(60) Provisional application No. 62/733,947, filed on Sep. 20, 2018.

(51) Int. Cl.
*H04L 43/0852* (2022.01)
*H04L 43/106* (2022.01)
*H04W 24/10* (2009.01)

(52) U.S. Cl.
CPC ........ *H04L 43/0858* (2013.01); *H04L 43/106* (2013.01); *H04W 24/10* (2013.01)

(58) Field of Classification Search
CPC ............. H04L 43/0858; H04L 43/106; H04W 24/10; H04W 12/037; H04W 12/06; H04W 24/08

USPC .......................................................... 370/252
See application file for complete search history.

(56) References Cited

U.S. PATENT DOCUMENTS

| | | | |
|---|---|---|---|
| 9,787,559 B1 | 10/2017 | Schroeder | |
| 2015/0142929 A1 | 5/2015 | White et al. | |
| 2015/0281004 A1 | 10/2015 | Kakadia et al. | |
| 2017/0078900 A1 | 3/2017 | Prokofiev | |
| 2017/0244617 A1 | 8/2017 | Begwani et al. | |
| 2017/0257461 A1* | 9/2017 | Wood ..................... | H04L 69/22 |
| 2017/0289297 A1 | 10/2017 | Shankaran et al. | |
| 2018/0098251 A1 | 4/2018 | Li et al. | |
| 2018/0213426 A1 | 7/2018 | Latheef et al. | |

(Continued)

FOREIGN PATENT DOCUMENTS

| | | |
|---|---|---|
| CN | 104978335 A * | 10/2015 |
| JP | 2007179100 A | 7/2007 |
| WO | 2017167392 A1 | 10/2017 |

(Continued)

OTHER PUBLICATIONS

Intel, "pCR 28.550 Add UC and requirements on NSSI measurement job query", S5-182171 (revision of S5A-17xabc) 3GPP TSG SA WG5 (Telecom Management) Meeting #118, Beijing, China, Agenda Item 6.4.5, Apr. 9-13, 2018, 2 pages.

(Continued)

*Primary Examiner* — Rownak Islam
(74) *Attorney, Agent, or Firm* — Dorsey & Whitney LLP

(57) ABSTRACT

Systems, methods, and apparatuses provide for collecting end-to-end (e2e) one way latency measurements and solutions for performance data streaming. The e2e performance measurements and performance data streaming (real-time performance measurements) may be used for performance assurance of 5G networks including network slicing.

20 Claims, 12 Drawing Sheets

(56) References Cited

U.S. PATENT DOCUMENTS

2019/0007899 A1 1/2019 Vrzic et al.
2019/0253917 A1 8/2019 Dao

FOREIGN PATENT DOCUMENTS

WO 2017177042 A1 10/2017
WO 2017222613 A1 12/2017

OTHER PUBLICATIONS

Huawei, "Add Usecase and requirement for NF performance management related to VR", S5-183141 (revision of S5-183abc) 3GPP TSG SA WG5 (Telecom Management) Meeting #119, La Jolla (US), Agenda Item 6.4.5, May 14-18, 2018, 3 pages.

Intel, "pCR 28.550 Add UC and requirements on NSSI measurement job query", S5-182510 (revision of S5A-17xabc) 3GPP TSG SA WG5 (Telecom Management) Meeting #118, Apr. 9-13, 2018, 2 pages.

Intel, "pCR 28.551 Add measurement job control related operations", S5-183158 (revision of S5A-18xabc) 3GPP TSG SA WG5 (Telecom Management) Meeting #119, La Jolla (US), Agenda Item 6.4.5, May 14-18, 2018, 6 pages.

Intel, "pCR 28.551 Add measurement job control related operations", S5-183452 (revision of S5A-18xabc) 3GPP TSG SA WG5 (Telecom Management) Meeting #119, La Jolla (US) Agenda Item 6.4.5, May 14-18, 2018, 6 pages.

Intel, "pCR 28.551 Add procedure for NSSI measurement job creation", S5-183166 (revision of S5A-18xabc) 3GPP TSG SA WG5 (Telecom Management) Meeting #119, La Jolla (US) Agenda Item 6.4.5, May 14-18, 2018, 3 pages.

PCT/US2019/051932, International Search Report and Written Opinion, Jan. 3, 2020, 12 pages.

U.S. Appl. No. 17/276,406, Final Office Action, May 17, 2024, 33 pages.

U.S. Appl. No. 17/276,406 , Non-Final Office Action, Dec. 19, 2023, 29 pages.

U.S. Appl. No. 17/276,406, Non-Final Office Action, Aug. 29, 2024, 34 pages.

\* cited by examiner

SYSTEMS, METHODS, AND DEVICES FOR END-TO-END MEASUREMENTS AND PERFORMANCE DATA STREAMING

CROSS-REFERENCE TO RELATED APPLICATIONS

This application is a continuation of U.S. patent application Ser. No. 17/276,406, filed Mar. 15, 2021, which is a national stage filing under 35 U.S.C. § 371 of International Patent Application No. PCT/US2019/051932, filed Sep. 19, 2019, which claims the benefit of U.S. Provisional Application No. 62/733,947, filed Sep. 20, 2018, each of which is hereby incorporated by reference herein in its entirety.

TECHNICAL FIELD

This application relates generally to wireless communication systems, and more specifically to end-to-end (e2e) latency measurements and performance data streaming.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION 5G networks and network slicing are designed to support, for example, enhanced mobile broadband (eMBB), ultra-reliable and low latency (URLLC), and massive internet of things (mIoT) services. Some services have ultra-low latency, high data capacity, and strict reliability requirements where faults or performance issues in the networks can cause service failure. Therefore, collection of real-time performance data and/or performance measurements are useful for analytic applications (e.g., network optimization, self-organizing network (SON), etc.) to detect the potential issues in advance, and take appropriate actions to prevent or mitigate the issues. Also, the performance data may be able to be consumed by multiple analytic applications with specific purposes. The 5G services (e.g., eMBB, URLLC, mIoT, and/or other like services) may have requirements for end-to-end (e2e) performance of the 5G networks. Thus, it would be useful to define e2e performance measurements for 5G networks. While e2e latency measurements are discussed in 3GPP TS 28.552 (section 6.1), the mechanism/procedure for e2e latency measurements has not yet been defined.

The raw performance data of one or more network function (NF), network slice subnet instance (NSSI), and network slice instance (NSI) can be further analyzed, and formed into one or more management analytical key performance indicator (KPI). The management analytical KPI(s) can be used to diagnose ongoing issues impacting the NSI/NSSI performance and predict any potential issues (e.g., potential failure and/or performance degradation). For example, the analysis of NSI/NSSI resource usage can form a KPI indicating whether a certain resource is deteriorating. The analysis and correlation of the overall NSI/NSSI performance data may indicate overload situation and potential failure(s). The SON use case of Capacity and Coverage Optimization (CCO) is one typical case for the management data analytics. CCO provides optimal coverage and capacity for the E-UTRAN, which may also be applicable for 5G radio networks. Collecting CCO related performance measurements helps to realize the situation of coverage and capacity or interference which may then trigger corresponding optimization if needed.

The e2e latency measurement is one type of KPI related to e2e 5G network and network slicing. This KPI is the mean or average e2e latency of UE IP packets transmitted from a UE to the N6 interface in the 5G network. Sampled internet protocol (IP) packets in the 5G network are measured to compute the mean time it takes for IP packets transmitted from end to end within 5G network.

Figure 1:
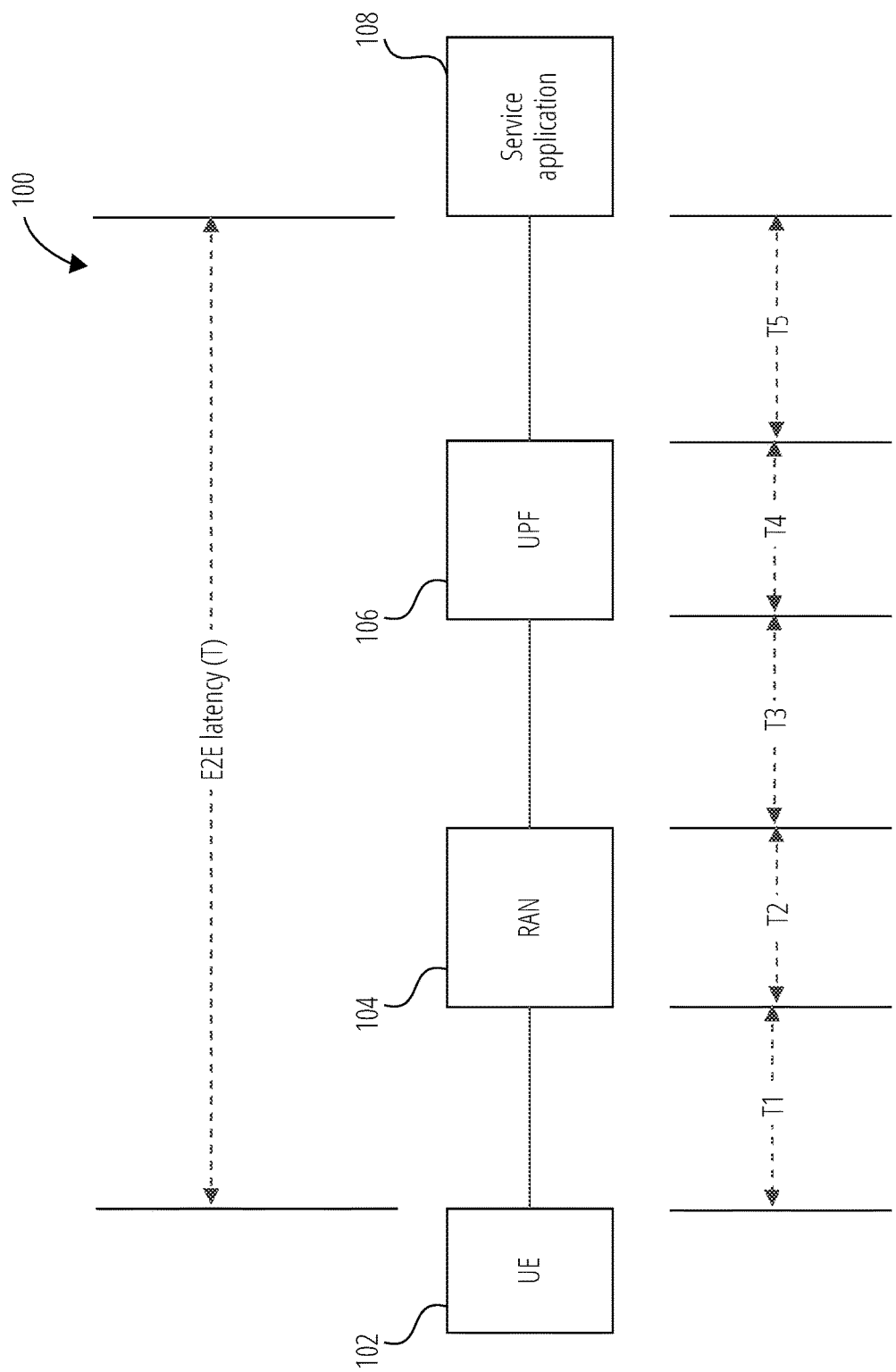
FIG. 1 is a timing diagram illustrating e2e latency in a wireless communication system.

FIG. 1 is an example timing diagram 100 illustrating e2e latency in a wireless communication system. The timing diagram 100 timing for packets sent between a UE 102, a RAN node 104, a user plane function (shown as UPF 106), and a service application 108. The e2e latency for a single user data packet is the time used for transmitting the user data packet between the UE 102 and the service application 108. The e2e latency (T) comprises the time used for transmitting the data packet at every segment, as shown in FIG. 1.

In the example of FIG. 1, T1 is the time used for transmitting the data packet between the UE 102 and the RAN node 104. T2 is the time used within the RAN node 104 between transmitting and receiving the data packet. The T2 may be further decomposed if the RAN node 104 includes multiple units (e.g., central unit (CU) and distributed unit (DU)). T3 is the time used for transmitting the data packet between RAN node 104 and the UPF 106. T4 is the time used within the UPF 106 between transmitting and receiving the data packet. T5 is the time used for transmitting the data packet between the UPF 106 and the service application 108.

For the e2e latency measurements, both the average e2e latency and maximum latency may be measured, according to certain embodiments. For average e2e latency, the average e2e latency (T) can be calculated by aggregating the average T1, average T2, average T3, average T4 and average T5, wherein T (average)=T1 (average)+T2 (average)+T3 (average)+T4 (average)+T5 (average).

For maximum e2e latency, a user data packet may not encounter maximum delay at every segment (T1, T2, T3, T4 and T5) at the same time, e.g., the user data packet that encounters the maximum delay on T1 may not encounter the maximum on the other segments. Therefore, the maximum e2e latency (T) cannot be calculated by aggregating the maximum T1, maximum T2, maximum T3, maximum T4 and maximum T5, wherein T (maximum)≠T1 (maximum)+T2 (maximum)+T3 (maximum)+T4 (maximum)+T5 (maximum). Thus, to measure the maximum e2e latency, the current measurement job mechanism is not sufficient, and a new mechanism is needed.

The performance data streaming is targeted to support near-real time reporting of the performance measurements. The reporting interval may be shorter than the traditional file-based performance data reporting. The number of performance measurements to be reported by performance data streaming is may be relatively small, and the consumer may be able to customize which performance measurements are to be reported by performance data in a measurement job. In certain embodiments, the service producer may reject the job creation request if the number of performance measurements to be reported by streaming reaches the maximum limit that the service producer can support.

For performance data streaming, the reporting interval may be configurable by the consumer, as the consumer may use the performance measurements to support different purposes that have different real-time requirements. The use cases and requirements on performance data streaming are discussed in 3GPP TS 28.550, and the solutions are needed.

Performance data streaming has shorter reporting intervals (than performance data file reporting), and it sends the measurement results directly in the message (e.g., an operation or notification) to the consumer, instead of putting the measurements results into the file and notifying the consumers about the file readiness. The performance data streaming allows the consumer to directly obtain and process the measurement results from the message instead of performing additional steps to download and parse the files.

Given the characteristics of performance data streaming as de scribed above, if the performance data streaming service producer is responsible for streaming of measurements results for many NFs, the streaming message (e.g., an operation or notification) can be very heavy (i.e., use excessive time and resources). It is not an efficient solution to process the heavy messages periodically with short intervals.

The present disclosure provides mechanism for collecting e2e one way latency measurements and solutions for performance data streaming. The e2e performance measurements and performance data streaming (real-time performance measurements) are useful data for performance assurance of 5G networks including network slicing.

A. E2E Latency Measurements

Figure 2:
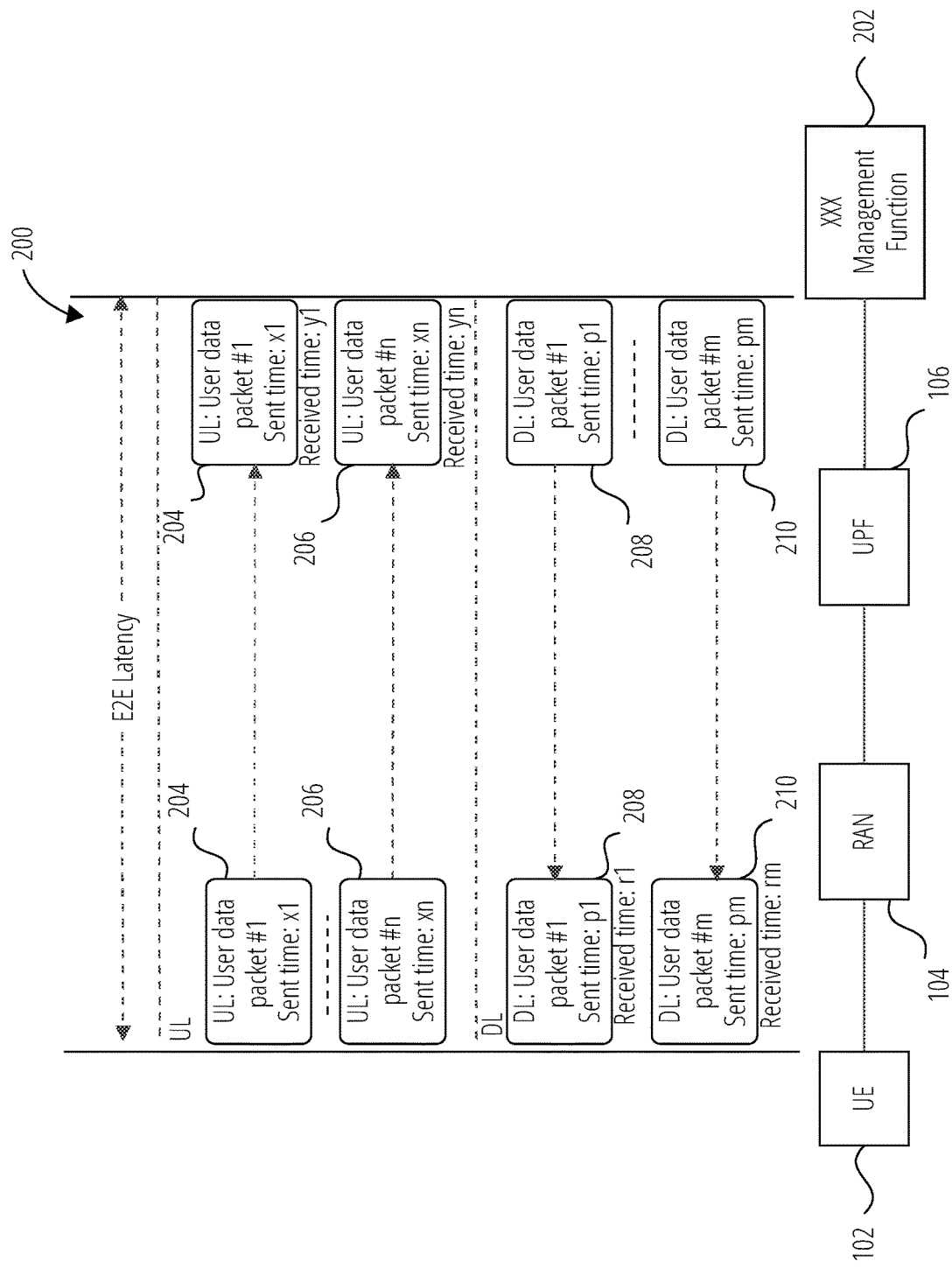
FIG. 2 is a timing diagram illustrating e2e latency measurement in accordance with one embodiment.

FIG. 2 is a timing diagram 200 illustrating e2e latency measurement in accordance with one embodiment. The timing diagram 200 illustrates timing of uplink (UL) and downlink (DL) packets sent between the UE 102, the RAN node 104, the UPF 106, and an XXX Management Function 202. In this example, the packets include a UL e2e latency measurement packet 204, a UL e2e latency measurement packet 206, a DL e2e latency measurement packet 208, and a DL e2e latency measurement packet 210.

For computing the e2e latency (e.g., maximum e2e latency), the management system needs to know the time that the sender (e.g., the UE 102) sent the user data packet and the time that the receiver (e.g., the service application 108 shown in FIG. 1) received the same user packet. However, in real networks, the service application 108 is out of 3GPP scope and 3GPP network cannot control the service application 108.

Therefore, according to certain embodiments, in order to know the time that the user data packet is sent and the time that the same data packet is received, a management function (e.g., the XXX Management Function 202 shown in FIG. 2) is used to act as a special service application, and the user data packets for measuring the e2e latency are sent between the UE 102 and the XXX Management Function 202.

For the services that require low latency, the service applications (e.g., edge computing applications) are normally deployed in local data centers. The e2e latency measurements are particularly useful for these kinds of services, and to support the measurement of e2e latency for this scenario the XXX Management Function 202 may be deployed to the same location (e.g, the data center) as where the service applications are deployed. And in NFV environment, it is viable that the XXX Management Function and service application are all deployed as VNF(s), and deployed to the same location.

For service applications deployed remotely, the operator normally does not know where these service applications are exactly deployed and the location of the service applications may change at any time without informing the 3GPP network operator. Thus, it would have less value to measure the latency from the UE 102 and the remote service application from the 3GPP network point of view. Instead, to reflect the 3GPP network performance, in certain such embodiments it makes more sense to measure the e2e latency between the UE 102 and the UPF 106 from the 3GPP network's perspective, and for this purpose the XXX Management Function 202 can be deployed to the same location as the UPF 106.

In certain embodiments, the XXX Management Function 202 is configured to measure e2e latency, as shown in FIG. 2. The management system requests the 5G network to establish the user plane connections (bearers, packet data protocol (PDP) sessions, etc.) between the UE 102 and the XXX Management Function 202.

For UL e2e latency, the management system requests the UE 102 to send the "special" user data packets (e.g., the UL e2e latency measurement packet 204 and/or the UL e2e latency measurement packet 206) to the XXX Management Function 202, and in each data packet the UE 102 marks the time that the packet was sent. For example, the UE 102 marks the UL e2e latency measurement packet 204 (shown as UL user data packet #1) as sent at time x1 and the UL e2e latency measurement packet 206 (shown as UL user data packet #n) as sent at time xn. When the packets are received by the XXX Management Function 202, the XXX Management Function 202 records the time that each packet is received. For example, the XXX Management Function 202 records the received time y1 for UL e2e latency measurement packet 204 and the received time yn for the UL e2e latency measurement packet 206. The XXX Management Function 202 may compute the UL e2e latency for each packet (e.g., the time difference between the sent time and the received time). In addition, or in other embodiments, the sent time and received time for each packet may be reported to management system to determine the UL e2e latency. The XXX Management Function 202 may calculate the average UL e2e latency and a maximum UL e2e latency for the packets for a period of time, and reports to the management system and/or directly to a consumer application.

For DL e2e latency, the management system requests the XXX Management Function 202 to send the "special" user data packets (e.g., the DL e2e latency measurement packet 208 and/or the DL e2e latency measurement packet 210) to one or more UEs (e.g., including the UE 102), and in each data packet the XXX Management Function 202 marks the time that the packet was sent. For example, the XXX Management Function 202 marks the DL e2e latency measurement packet 208 (shown as DL user data packet #1) as sent at time p1 and the DL e2e latency measurement packet 210 (shown as DL user data packet #m) as sent at time pm. When the packets are received by the UE 102, the UE 102 records the time that each packet has been received. For example, the UE 102 records that the DL e2e latency measurement packet 208 is received at time r1 and the DL e2e latency measurement packet 210 is received at time rm. The UE 102 may compute the DL e2e latency for each packet (e.g., the time difference between the sent time and the received time). In certain embodiments, the UE 102 reports the computed DL e2e latency for each packet to management system. In addition, or in other embodiments, the UE 102 reports the sent time and the received time to the management system to determine the DL e2e UL e2e latency measurement packet 204. In other embodiments, the UE 102 calculates an average DL e2e latency and a maximum DL e2e latency for the packets for a period of time, and then reports to the management system.

B. Performance Data Streaming

As discussed above, certain embodiments herein are directed to performance data streaming to support near-real time reporting of performance measurements. To provide performance data streaming, details are provided below for creation of a measurement job for NF(s), creation of a measurement job for NSSI(s), creation of a measurement job for NSI(s), creation of a measurement job for network(s)/sub-network(s), requirements for NF measurement job control service, requirements for NSSI measurement job control service, requirements for NSI measurement job control service, requirements for network/sub-network measurement job control service, an example create measurement job operation, performance data streaming related notifications, and an example location of an NF performance data streaming service producer.

B(1). Creation of a Measurement Job For NF(s)

Table 1 includes details for the creation of a measurement job for NF(s), according to an example embodiment.

TABLE 1

| Use case stage | Evolution/Specification | <<Uses>> Related use |
| --- | --- | --- |
| Goal | To enable the authorized consumer to create a measurement job for collecting the performance data of NF(s). | |
| Actors and Roles | An authorized consumer of NF measurement job control service. | |
| Telecom resources | NF(s); Producer of the NF measurement job control service. | |
| Assumptions | N/A | |
| Pre-conditions | The NF(s) have been deployed. The NF measurement job control service producer is in operation. | |
| Begins when | The authorized consumer needs to create measurement job for collecting the performance data of NF(s). | |
| Step 1 (M) | The authorized consumer requests the NF measurement job control service producer to create measurement job to collect the performance data of NF(s). The request needs to indicate that the performance data needs to be reported by performance data file or by performance data streaming. If the performance data is to be reported by streaming, the number of the performance data is expected to be small, and the reporting interval of the performance data stream needs to be configurable and is expected to be short (e.g., 1 minute). | |

TABLE 1-continued

| Use case stage | Evolution/Specification | <<Uses>> Related use |
|---|---|---|
| Step 2 (M) | The NF measurement job control service producer requests the NF(s) to collect the performance data, per the received measurement job creation request. | |
| Ends when | All the steps identified above are successfully completed. | |
| Exceptions | One of the steps identified above fails. | |
| Post-conditions | The measurement job for NF(s) has been created, and the NF measurement job control service producer generates the performance data for the NF measurement job. The NF measurement job control service producer may reject the job creation request in case the number of performance data to be reported by performance data streaming reaches the maximum limit that the service producer can support. | |
| Traceability | REQ-MJCS_NF-FUN-1, REQ-MJCS_NF-FUN-2, REQ-MJCS_NF-FUN-3, REQ-MJCS_NF-FUN-4 and REQ-MJCS_NF-FUN-x | |

B(2). Creation of a Measurement Job For NSSI(s)

Table 2 includes details for the creation of a measurement job for NSSI(s), according to an example embodiment.

TABLE 2

| Use case stage | Evolution/Specification | <<Uses>> Related use |
|---|---|---|
| Goal | To enable the authorized consumer to create a measurement job for collecting the performance data of NSSI(s). | |
| Actors and Roles | An authorized consumer of NSSI measurement job control service. | |
| Telecom resources | NSSI(s); NSSI measurement job control service producer; NF measurement job control service producer; NF performance data file reporting service producer and/or NF performance data streaming service producer; NSSI performance data file reporting service producer and/or NSSI performance data streaming service producer. | |
| Assumptions | N/A | |
| Pre-conditions | The NSSI(s) have been deployed. The NSSI measurement job control service producer is in operation. | |
| Begins when | The authorized consumer needs to create measurement job for collecting the performance data of NSSI(s). | |
| Step 1 (M) | The authorized consumer requests the NSSI measurement job control service producer to create a NSSI measurement job to collect the performance data of NSSI(s). The request needs to indicate that the performance data needs to be reported by performance data file or by performance data streaming. If the performance data is to be reported by streaming, the number of the performance data is expected to be small, and the reporting interval of the performance data stream needs to be configurable and is expected to be short (e.g., 1 minute). | |
| Step 2 (M) | The NSSI measurement job control service producer decomposes the performance data type(s) of NSSI into performance data type(s) of the constituent NSSI(s) and/or NF(s). The NSSI measurement job control service producer checks whether the decomposed performance data types of the constituent NSSI(s) and NF(s) can be collected by the existing measurement job(s) for NSSI(s) and/or NF(s). If new measurement job(s) for the constituent NSSI(s) and/or NF(s) are required, the NSSI measurement job control service producer consumes the NSSI measurement job control service and/or the NF measurement job control service to create the new measurement job(s) for the constituent NSSI(s) and/or NF(s) respectively (according to the use case "Creation of measurement job for NF" as described in clause 5.1.1.1.1). | Creation of measurement job for NF |
| Ends when | All the steps identified above are successfully completed. | |
| Exceptions | One of the steps identified above fails. | |
| Post-conditions | The measurement job for NSSI has been created, and the NSSI measurement job control service producer consumes the NSSI performance data file reporting service and/or NSSI performance data streaming service to get the performance data of the constituent NSSI(s), and/or consumes the NF performance data file reporting service and/or NF performance data streaming | NSSI performance data file reporting; NSSI performance |

TABLE 2-continued

| Use case stage | Evolution/Specification | <<Uses>> Related use |
|---|---|---|
| | service to get the performance data of the constituent NF(s), and generates the performance data for the NSSI measurement job. The NSSI measurement job control service producer may reject the job creation request in case the number of performance data to be reported by performance data streaming reaches the maximum limit that the service producer can support. | data streaming; |
| Traceability | REQ-MJCS_NSSI-FUN-1, REQ-MJCS_NSSI-FUN-2, REQ-MJCS_NSSI-FUN-3, REQ-MJCS_NSSI-FUN-4 and REQ-MJCS_NSSI-FUN-x | |

B(3). Creation of a Measurement Job For NSI(s)

Table 3 includes details for the creation of a measurement job for NSI(s), according to an example embodiment.

TABLE 3

| Use case stage | Evolution/Specification | <<Uses>> Related use |
|---|---|---|
| Goal | To enable the authorized consumer to create a measurement job for collecting the performance data of NSI(s). | |
| Actors and Roles | An authorized consumer of NSI measurement job control service. | |
| Telecom resources | NSI(s); NSI measurement job control service producer; The set of NSSI measurement job control service producer, NSSI performance data file reporting service producer and/or NSSI performance data streaming service producer; and/or The set of NF measurement job control service producer, NF performance data file reporting service producer and/or NF performance data streaming service producer. | |
| Assumptions | N/A | |
| Pre-conditions | The NSI(s) have been deployed. The NSI measurement job control service producer is in operation. | |
| Begins when | The authorized consumer needs to create measurement job for collecting the performance data of NSI(s). | |
| Step 1 (M) | The authorized consumer requests the NSI measurement job control service producer to create a NSI measurement job to collect the performance data of NSI(s). The request needs to indicate that the performance data needs to be reported by performance data file or by performance data streaming. If the performance data is to be reported by streaming, the number of the performance data is expected to be small, and the reporting interval of the performance data stream needs to be configurable and is expected to be short (e.g., 1 minute). | |
| Step 2 (M) | The NSI measurement job control service producer decomposes the performance data type of NSI(s) into performance data type(s) of the constituent NSSI(s) and/or of constituent NF(s). The NSI measurement job control service producer checks whether the decomposed performance data of the constituent NSSI(s) can be collected by the existing measurement job(s) for NSSI(s). If new measurement job(s) for the constituent NSSI(s) are required, the NSI measurement job control service producer consumes the NSSI measurement job control service to create the new measurement job(s) for the constituent NSSI(s) (according to the use case "Creation of measurement job for NSSI(s)" as described in clause 5.1.2.1.1); or The NSI measurement job control service producer checks whether the decomposed performance data of the constituent NF(s) can be collected by the existing measurement job(s) for NF(s). If new measurement job(s) for the constituent NF(s) are required, NSI measurement job control service producer requests the NF PM measurement job control service producer to create the new measurement job(s) for the constituent NF(s) (according to the use case "Creation of measurement job for NF" as described in clause 5.1.1.1.1). | Creation of measurement job for NSSI; and/or Creation of measurement job for NF |
| Ends when | All the steps identified above are successfully completed. | |
| Exceptions | One of the steps identified above fails. | |
| Post-conditions | The measurement job for NSI has been created, and the NSI measurement job control service producer consumes the NSSI | NSSI performance |

TABLE 3-continued

| Use case stage | Evolution/Specification | <<Uses>> Related use |
|---|---|---|
| | performance data file reporting service, NSSI performance data streaming service, the NF performance data file reporting service and/or NF performance data streaming service to get the performance data of the constituent NSSI(s) and/or NF(s), and generates the performance data for the NSI measurement job. The NSI measurement job control service producer may reject the job creation request in case the number of performance data to be reported by performance data streaming reaches the maximum limit that the service producer can support. | data file reporting; NSSI performance data streaming |
| Traceability | REQ-MJCS_NSI-FUN-1, REQ-MJCS_NSI-FUN-2, REQ-MJCS_NSI-FUN-3, REQ-MJCS_NSI-FUN-4, and REQ-MJCS_NSI-FUN-x | |

B(4). Creation of a Measurement Job For Network(s)/Sub-Network(s)

Table 4 includes details for the creation of a measurement job for network(s)/sub-network(s), according to an example embodiment.

TABLE 4

| Use case stage | Evolution/Specification | <<Uses>> Related use |
|---|---|---|
| Goal | To enable the authorized consumer to create a measurement job for collecting the network/sub-network performance data that are not specific to network slicing. | |
| Actors and Roles | An authorized consumer of network measurement job control service. | |
| Telecom resources | Network(s)/sub-network(s); Network measurement job control service producer; NF measurement job control service producer; NF performance data file reporting service producer and/or NF performance data streaming service producer. | |
| Assumptions | N/A | |
| Pre-conditions | The network(s)/sub-network(s) have been deployed; The network measurement job control service producer is in operation. | |
| Begins when | The authorized consumer needs to create a network measurement job for collecting the network performance data that are not specific to network slicing. | |
| Step 1 (M) | The authorized consumer requests the network measurement job control service producer to create measurement job to collect the network performance data that are not specific to network slicing. The request needs to indicate that the performance data needs to be reported by performance data file or by performance data streaming. If the performance data is to be reported by streaming, the number of the performance data is expected to be small, and the reporting interval of the performance data stream needs to be configurable and is expected to be short (e.g., 1 minute). | |
| Step 2 (M) | The network measurement job control service producer decomposes the performance data type of network/sub-network into performance data type(s) of the constituent 3GPP NF(s). The network measurement job control service producer whether the decomposed performance data type(s) of the constituent NF(s) can be collected by the existing measurement job(s) for NF(s). If new measurement job(s) for the constituent NF(s) are required, the network measurement job control service producer requests the NF measurement job control service producer to create the new measurement job(s) for the constituent NF(s) (according to the use case "Creation of measurement job for NF" as described in clause 5.1.1.1.1). | Creation of measurement job for NF |
| Ends when | All the steps identified above are successfully completed. | |
| Exceptions | One of the steps identified above fails. | |
| Post-conditions | The measurement job for network(s)/sub-network(s) has been created, and the network measurement job control service producer consumes the NF performance data file reporting service and/or NF performance data streaming service to get the performance data of the constituent NF(s), and generates the performance data for the network measurement job. | NF performance data file reporting; NF performance |

TABLE 4-continued

| Use case stage | Evolution/Specification | <<Uses>> Related use |
|---|---|---|
| | The Network measurement job control service producer may reject the job creation request in case the number of performance data to be reported by performance data streaming reaches the maximum limit that the service producer can support. | data streaming |
| Traceability | REQ-MJCS_NW-FUN-1, REQ-MJCS_NW-FUN-2, REQ-MJCS_NW-FUN-3, REQ-MJCS_NW-FUN-4 and REQ-MJCS_NW-FUN-x | |

B(5). Requirements For NF Measurement Job Control Service

In certain embodiments, the following parameters are defined for NF measurement job service.

REQ-MJCS_NF-FUN-1: The management service producer responsible for NF measurement job control shall have the capability allowing its authorized consumer to request creation of a measurement job to collect the performance data of NF(s).

REQ-MJCS_NF-FUN-2: The management service producer responsible for NF measurement job control shall have the capability allowing its authorized consumer to indicate the reporting method (i.e., by performance data file or by performance data streaming) for the performance data when requesting to create a measurement job for NF(s).

REQ-MJCS_NF-FUN-3: The management service producer responsible for NF measurement job control shall have the capability to fulfill the consumer's request to create a measurement job for NF(s).

REQ-MJCS_NF-FUN-4: The management service producer responsible for NF measurement job control shall have the capability to generate the performance data of NF(s) according to the measurement job.

REQ-MJCS_NF-FUN-5: The management service producer responsible for NF measurement job control shall have the capability to fulfill the request from its authorized consumer to terminate a NF measurement job.

REQ-MJCS_NF-FUN-6: The management service producer responsible for NF measurement job control shall have the capability allowing its authorized consumer to query the information about the ongoing NF measurement jobs.

REQ-MJCS_NF-FUN-x: The management service producer responsible for NF measurement job control may reject a NF measurement job creation request in case the number of performance data to be reported by performance data streaming reaches the maximum limit the service producer can support B(6). Requirements For NSSI Measurement Job Control Service In certain embodiments, the following parameters are defined for NSSI measurement job control service.

REQ-MJCS_NSSI-FUN-1: The management service producer responsible for NSSI measurement job control shall have the capability allowing its authorized consumer to request creation of a measurement job to collect the performance data of NSSI(s).

REQ-MJCS_NSSI-FUN-2: The management service producer responsible for NSSI measurement job control shall have the capability allowing its authorized consumer to indicate the reporting method (i.e. by performance data file or by performance data streaming) for the performance data when requesting to create a measurement job for NSSI(s).

REQ-MJCS_NSSI-FUN-3: The management service producer responsible for NSSI measurement job control shall have the capability to generate the performance data of NSSI(s).

REQ-MJCS_NSSI-FUN-4: The management service producer responsible for NSSI measurement job control shall have the capability to fulfill the consumer's request to create a measurement job for NSSI(s).

REQ-MJCS_NSSI-FUN-5: The management service producer responsible for NSSI measurement job control shall have the capability to fulfill the request from its authorized consumer to terminate a NSSI measurement job.

REQ-MJCS_NSSI-FUN-6: The management service producer responsible for NSSI measurement job control shall have the capability to fulfil the request from its authorized consumer to query the information about the ongoing NSSI measurement jobs.

REQ-MJCS_NSSI-FUN-x: The management service producer responsible for NSSI measurement job control may reject a NSSI measurement job creation request in case the number of performance data to be reported by performance data streaming reaches the maximum limit the service producer can support.

B(7). Requirements For NSI Measurement Job Control Service

In certain embodiments, the following parameters are defined for NSI measurement job control service.

REQ-MJCS_NSI-FUN-1: The management service producer responsible for NSI measurement job control shall have the capability allowing its authorized consumer to request creation of a measurement job to collect the performance data of NSI(s).

REQ-MJCS_NSI-FUN-2: The management service producer responsible for NSI measurement job control shall have the capability allowing its authorized consumer to indicate the reporting method (i.e. by performance data file or by performance data streaming) for the performance data when requesting to create a measurement job for NSI(s).

REQ-MJCS_NSI-FUN-3: The management service producer responsible for NSI measurement job control shall have the capability to generate the performance data of NSI(s).

REQ-MJCS_NSI-FUN-4: The management service producer responsible for NSI measurement job control shall have the capability to fulfill the consumer's request to create a measurement job for NSI(s).

REQ-MJCS_NSI-FUN-5: The management service producer responsible for NSI measurement job control shall have the capability to fulfill the request from its authorized consumer to terminate a NSI measurement job.

REQ-MJCS_NSI-FUN-6: The management service producer responsible for NSI measurement job control shall have the capability to fulfill the request from its authorized consumer to query the information about the ongoing NSI measurement jobs.

REQ-MJCS_NSI-FUN-x: The management service producer responsible for NSI measurement job control may reject a NSI measurement job creation request in case the number of performance data to be reported by performance data streaming reaches the maximum limit the service producer can support.

B(8). Requirements For Network/Sub-Network Measurement Job Control Service

In certain embodiments, the following parameters are defined for network/sub-network measurement job control service.

REQ-MJCS_NW-FUN-1: The management service producer responsible for network/sub-network measurement job control shall have the capability allowing its authorized consumer to request creation of a measurement job to collect the network/sub-network performance data that are not specific to network slicing.

REQ-MJCS_NW-FUN-2: The management service producer responsible for network/sub-network measurement job control shall have the capability allowing its authorized consumer to indicate the reporting method (i.e., by performance data file or by performance data streaming) for the performance data that are not specific to network slicing when requesting to create a measurement job for network (s)/sub-network(s).

REQ-MJCS_NW-FUN-3: The management service producer responsible for network/sub-network measurement job control shall have the capability to generate the network/sub-network performance data that are not specific to network slicing.

REQ-MJCS_NW-FUN-4: The management service producer responsible for network/sub-network measurement job control shall have the capability to fulfill the consumer's request to create a measurement job for network(s)/sub-network(s).

REQ-MJCS_NW-FUN-5: The management service producer responsible for network/sub-network measurement job control shall have the capability to fulfill the request from its authorized consumer to terminate a network/sub-network measurement job.

REQ-MJCS_NW-FUN-6: The management service producer responsible for network/sub-network measurement job control shall have the capability to fulfill the request from its authorized consumer to query the information about the ongoing network/sub-network measurement jobs.

REQ-MJCS_NW-FUN-x: The management service producer responsible for network/sub-network measurement job control may reject a network/sub-network measurement job creation request in case the number of performance data to be reported by performance data streaming reaches the maximum limit the service producer can support.

B(9). Example Create Measurement Job Operation

One embodiment includes an example create measurement job operation (Operation createMeasurementJob). The create measurement job operation supports an authorized consumer to request the measurement job control related service producer to create a measurement job. One measurement job can collect the value of one or multiple measurement types. The measurement types may include the performance measurements and assurance data defined in 3GPP TS 28.552.

When a measurement type is collected by one measurement job for a given instance (e.g., an NF instance), another measurement job creation request that wants to collect the same measurement type for the same instance with different granularity period may be rejected. This behavior may be consistent for a given implementation by a specific management service producer.

In certain embodiments, there are different methods for the performance data to be reported. In a performance data file method, the performance data is accumulated for certain time before it is reported, and the data can be delivered as a file. In a streaming type of reporting, the performance data is reported immediately after it is collected.

Table 5 includes example input parameters for the create measurement job operation.

TABLE 5

| Parameter Name | Qualifier | Information type | Comment |
|---|---|---|---|
| iOCName | M | The IOC name defined of the NRMs (e.g., as defined in TS 28.541), or the class name defined locally in the performance measurements specifications (e.g., TS 28.552). | It specifies one object class name. The consumer requests to collect one or more measurement type(s) of the instances of this class. |
| iOCInstanceList | M | List of DN | It specifies the list of DNs of object instances whose measurements of the corresponding type(s) are to be collected. An empty list means that for all instances (including the object instances existing at the time of measurement job creation, and the instances added later) known by the management service producer the measurements will be collected. |
| measurementCategoryList | M | List of measurement type names (see TS 28.552). | It specifies the measurement type(s) to be measured. The elements of the measurementCategoryList shall be one of the following forms: The form "family.measurementName.subcounter" can be used in order to retrieve a specified subcounter of a measurement type. |

TABLE 5-continued

| Parameter Name | Qualifier | Information type | Comment |
|---|---|---|---|
| | | | The form "family.measurementName" can be used in order to retrieve a specific measurement type. In case the measurement type includes subcounters, all subcounters will be retrieved.<br>The form "family" can be used in order to retrieve all measurement types in this family. |
| reportingMethod | M | The reporting method of the collected performance data. | It specifies the method for the collected performance data to be reported. The following methods can be used:<br>by performance data file<br>by performance data streaming. |
| granularityPeriod | M | The period between generation of two successive measurements. | The management service producer will generate the value of the measurements at the end of each granularityPeriod.<br>If the reportingMethod is performance data file reporting:<br>The value of granularityPeriod can be 5 minutes, 15 minutes, 30 minutes, 1 hour, 12 hours and 24 hours. If the value is 12 hours, then the first read shall be as soon as possible and subsequent reads shall be at 12 hours interval.<br>If the value is 24 hours, then the first read shall be as soon as possible and subsequent reads shall be at 24 hours interval.<br>If the reportingMethod is performance data streaming:<br>The value of granularityPeriod can be 1 to 15 minutes. If the value is x (1 to15) minute(s), the management service producer will generate the value of the measurement every $x^{th}$ minute. |
| reportingPeriod | M | The period between two successive performance data reporting. | Applicable when the reportingMethod is performance data file reporting.<br>The performance data report(s) are produced when the reporting period arrives.<br>The reportingPeriod shall be one or multiple of granularityPeriod. The measurement value of each granularityPeriod will be made available to the performance data reporting related service producer, who will prepare the performance data file(s) for each reportingPeriod.<br>If the consumer has subscribed to the notify FileReady and notifyFilePreparationError notifications from the performance data reporting related service producer, the consumer will receive the notifications about the result of the performance data file preparation from that producer with the interval as defined by reportPeriod; |
| startTime | O | It specifies the begin time from which the measurement job will be active. | All values that indicate valid timestamp.<br>Default value is "start now". If startTime is in the past, the current time will be used and the job will start immediately.<br>When a measurement job becomes active, it does not mean that the measurement job immediately starts generation of the measurements of the given type(s). The consumer can set the detailed time frame (e.g. dailySchedule or weeklySchedule) by schedule parameter for a measurement job to generate the measurements. If there is no time frame scheduled, the measurement job immediately starts generation of the measurements when it becomes active. |
| stopTime | O | It specifies the end time after which the measurement job will be stopped. | The value indicates valid timestamp and shall be later than startTime and current time.<br>This attribute may carry the value "indefinitely".<br>Default value is to run indefinitely. |
| schedule | O | It specifies the detailed time frames (within the startTime and stopTime) during which the measurement job is active and monitors the measurement type(s). | Its value is only one of the following, dailyScheduling or weeklyScheduling. The legal values for them refer to ITU-T Recommendation X.721.<br>The legal values for them are as follows.<br>dailyScheduling:<br>{{intervalStart {hour 0, minute 0},<br>intervalEnd {hour 23, minute 59}}}<br>weeklyScheduling:<br>{{daysOfWeek '1111111'B,<br>intervalsOfDay dailyScheduling}}<br>Default value is "daily". |

TABLE 5-continued

| Parameter Name | Qualifier | Information type | Comment |
|---|---|---|---|
| priority | O | It specifies the priority of measurement job | Its value should be one of the following: Low, Medium, High Default value is "Medium" |
| reliability | O | It specifies the reliability of measurement job | Its value is vendor specific. NOTE: meaning of "reliability" is not defined in the present document. |

Table 6 includes example output parameters for the create measurement job operation.

TABLE 6

| Parameter Name | Qualifier | Matching Information | Comment |
|---|---|---|---|
| jobId | M | It identifies the measurement job instance (and distinguishes it from all other ongoing and stopped measurement job instances that have been created for the subject consumer). | Unique identifier of the measurement job from all the ongoing and stopped Measurement jobs that have been created for the subject consumer. |
| unsupportedList | M | List of < iOC instance, measurement type name, reason | To create a measurement job, best-effort is required. The parameter of 'unsupportedList' must be returned if status = PartialSuccess. The reason can be any of: Measurement type name is unknown. Measurement type name is invalid. Measurement type name is not supported in the specific implementation. Measurement type name is already monitored for the IOC instance with a different granularityPeriod. The related IOC instance is unknown (e.g. it does not exist at the time of this operation invocation). Insufficient capacity to monitor the related IOC instance(s). |
| status | M | ENUM (Success, Failure, PartialSuccess) | An operation may fail because of a specified or unspecified reason. |

Table 7 includes example exceptions for the create measurement job operation.

TABLE 7

| Exception Name | Definition |
|---|---|
| invalidStartTime | Condition: startTime is invalid. Returned Information: Name of the exception; status is set to 'Failure'. |
| invalidStopTime | Condition: stopTime is invalid. Returned Information: Name of the exception; status is set to 'Failure'. |
| invalidSchedule | Condition: schedule is invalid. Returned Information: Name of the exception; status is set to 'Failure'. |
| invalidReportingMethod | Condition: reportingMethod is invalid. Returned Information: Name of the exception; status is set to 'Failure'. |
| invalidGranularityPeriod | Condition: granularityPeriod is invalid. Returned Information: Name of the exception; status is set to 'Failure'. |
| invalidReportingPeriod | Condition: reportingPeriod is invalid. Returned Information: Name of the exception; status is set to 'Failure'. |
| high WorkLoad | Condition: no sufficient capacity Returned Information: Name of the exception and the detailed reason which is one of: CpuBusy; DiskShortage, LowMemory, maxJobReached, maxStreamingDataReached, otherReason; status is set to 'Failure'. |
| noValidMeasurementType | Condition: all measurement type names are invalid (i.e. none of the measurement type names are valid). Returned information: output parameter status is set to 'Failure'. |

TABLE 7-continued

| Exception Name | Definition |
|---|---|
| invalidPriority | Condition: priority is invalid.<br>Returned Information: Name of the exception; status is set to 'Failure'. |
| invalidReliability | Condition: reliability is invalid.<br>Returned Information: Name of the exception; status is set to 'Failure'. |

B(10). Performance Data Streaming Related Notifications

One embodiment includes an example performance data stream notification (Notification performanceDataStream). The performance data stream notification supports the authorized consumer to receive the performance data streams. When the reporting period arrives, the performance data streaming service producer emits the notification carrying the measurement result of one or more measured object(s) for a measurement job to the authorized consumer(s) who have subscribed to this notification. In certain embodiments, the performance data streaming service producer only emits the notifications related to the measurement job(s) created for the subject consumer.

Table 8 includes example notification information for the performance data stream notification.

TABLE 8

| Parameter Name | Qualifier | Information Type | Comment |
|---|---|---|---|
| objectClass | M, Y | Type of the performance data streaming producer, e.g., "PerformanceDataStreamingServiceProducer". | It indicates the class, whose instance emitted this notification. The class indicates the type of the performance data streaming service producer. |
| objectInstance | M, Y | Identifier of the performance data streaming service producer | It identifies the performance data streaming service producer, who actually emitted the notification. |
| notificationId | M, N | This is an identifier of the notification, which may be used to correlate notifications. | The unique identifier of the notification across all notifications sent by a particular management service producer throughout the time that correlation is significant. How identifiers of notifications are re-used to correlate notifications is outside of the scope of this specification. |
| eventTime | M, Y | It indicates the event occurrence time, i.e., the time that the notification is sent. | The semantics of Generalised Time specified by ITU-T shall be used here. |
| notificationType | M, Y | "PerformanceDataStream" | The type of notification, and it shall be assigned to "PerformanceDataStream" for this notification. |
| jobId | M, Y | It represents the measurement job with which the performance data stream is associated. | |
| collectionBeginTime | M, Y | The "collectionBeginTime" is a time stamp that refers to the start of the measurement collection interval (granularity period). | |
| measData | M, Y | List of structure <<br>measObjDn,<br>measTypes,<br>measResults><br>>.<br>Each element is defined as following:<br>measObjDn: The "measObjDn" field contains the full distinguished name (DN) of the measured object.<br>measTypes: This is the list of measurement types for which the following, analogous list of measurement results ("measResults") pertains. The measurement types for 5G networks including network slicing are specified in TS 28.552 | |

TABLE 8-continued

| Parameter Name | Qualifier | Information Type | Comment |
|---|---|---|---|
| | | measResults: This parameter contains the sequence of result values for the observed measurement types. The measResults sequence shall have the same number of elements, which follow the same order as the meas Types sequence. The NULL value is reserved to indicate that the measurement item is not applicable or could not be retrieved for the measured object instance. | |
| additionalText | O, N | It provides additional information for this notification. | It carries vendor-specific semantics not defined in the present document. |

B(11). Example Location of an NF Performance Data Streaming Service Producer

Figure 3:
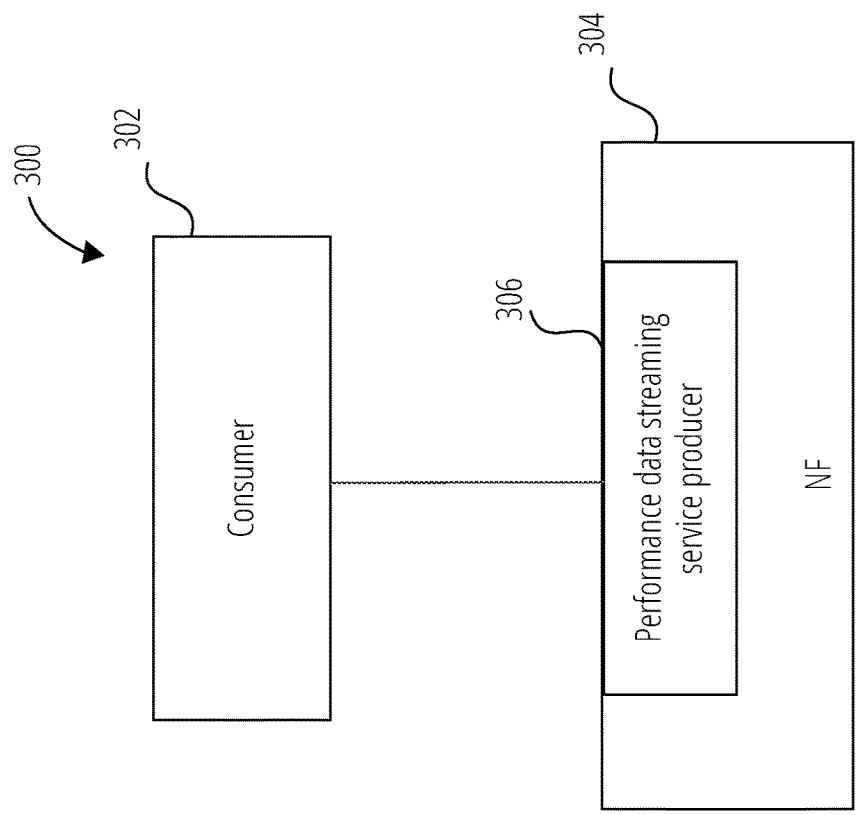
FIG. 3 is a block diagram illustrating elements of a wireless communication system in accordance with one embodiment.

In one embodiment, for performance data streaming services for NFs, the performance data streaming service producer is located in the NF. For example, FIG. 3 is a block diagram 300 illustrating elements of a wireless communication system. In particular, FIG. 3 shows a consumer application (shown as Consumer 302) in communication with an NF 304, wherein a performance data streaming service producer 306 is located in the NF 304. Persons skilled in the art will recognize, however, that in other embodiments, the performance data streaming service producer 306 may be located in other network functions or entities, or may be a standalone entity within the network.

Table 9 includes example components of performance data streaming services for NFs.

TABLE 9

| Management service | Management service component type A | Management service component type B | Management service component type C |
|---|---|---|---|
| Performance data streaming service for NFs | Notification: PerformanceDataStream | IOCs for 5G NFs, as defined in TS 28.541 | Performance measurements and assurance data for 5G NFs, as defined in draft TS 28.552. |

C. Example Methods

Figure 4:
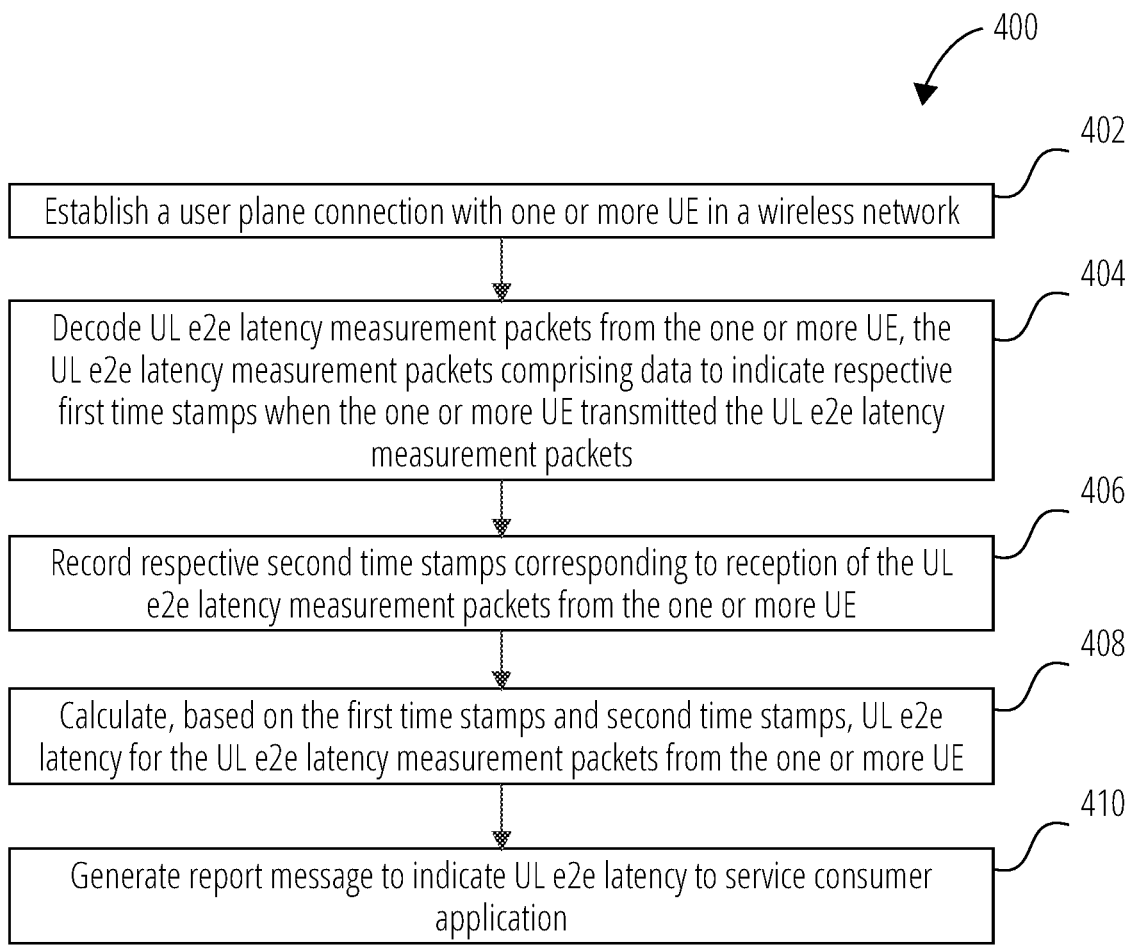
FIG. 4 is a flowchart illustrating a method for a management function in a wireless network in accordance with one embodiment.

FIG. 4 is a flowchart illustrating a method 400 for a management function in a wireless network. In block 402, the method 400 establishes a user plane connection with one or more UE in the wireless network. In block 404, the method 400 decodes UL e2e latency measurement packets from the one or more UE, the UL e2e latency measurement packets comprising data to indicate respective first time stamps when the one or more UE transmitted the UL e2e latency measurement packets. In block 406, the method 400 records respective second time stamps corresponding to reception of the UL e2e latency measurement packets from the one or more UE. In block 408, the method 400 calculates, based on the first time stamps and the second time stamps, an UL e2e latency for the UL e2e latency measurement packets from the one or more UE. In block 410, the method 400 generates a report message to indicate the UL e2e latency to a service consumer application.

Figure 5:
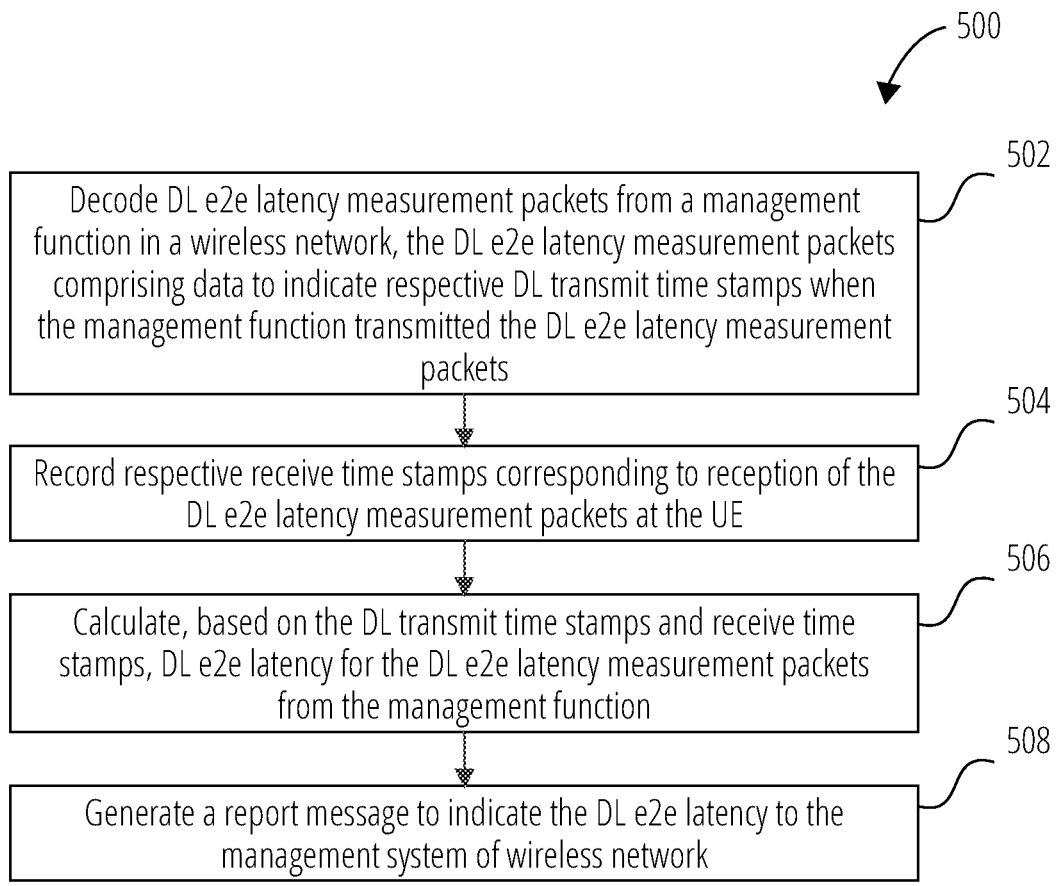
FIG. 5 is a flowchart illustrating a method for a UE in accordance with one embodiment.

FIG. 5 is a flowchart illustrating a method 500 for a UE. In block 502, the method 500 decodes DL e2e latency measurement packets from a management function in a wireless network, the DL e2e latency measurement packets comprising data to indicate respective DL transmit time stamps when the management function transmitted the DL e2e latency measurement packets. In block 504, the method 500 records respective receive time stamps corresponding to reception of the DL e2e latency measurement packets at the UE. In block 506, the method 500 calculates, based on the DL transmit time stamps and the receive time stamps, a DL e2e latency for the DL e2e latency measurement packets from the management function. In block 508, method 500 generates a report message to indicate the DL e2e latency to a management system of the wireless network.

Figure 6:
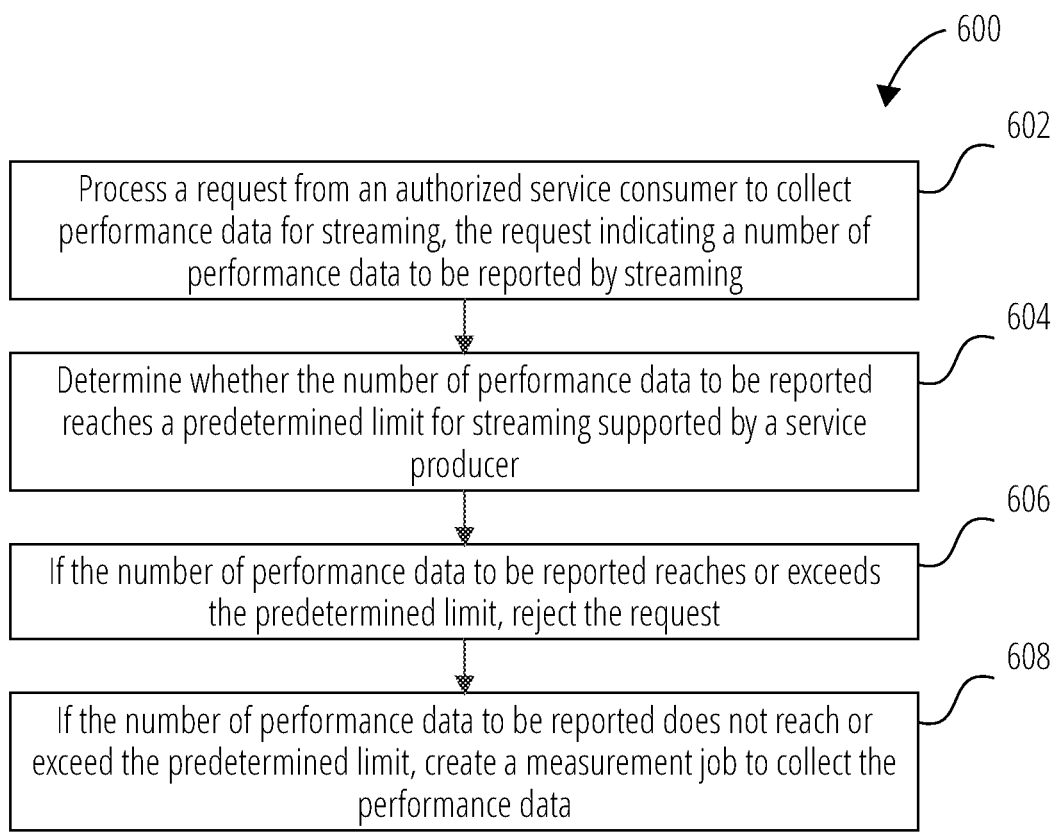
FIG. 6 is a flowchart illustrating a method for a service producer in a wireless network in accordance with one embodiment.

FIG. 6 is a flowchart illustrating a method 600 for a service producer in a wireless network. In block 602, the method 600 processes a request from an authorized service consumer to collect performance data for streaming, the request indicating a number of performance data to be reported by streaming. In block 604, the method 600 determines whether the number of performance data to be reported reaches a predetermined limit for streaming supported by the service producer. In block 606, the method 600, if the number of performance data to be reported reaches or exceeds the predetermined limit, rejects the request. In block 608, the method 600, if the number of performance data to be reported does not reach or exceed the predetermined limit, creates a measurement job to collect performance data.

D. Example Systems and Apparatuses

Figure 7:
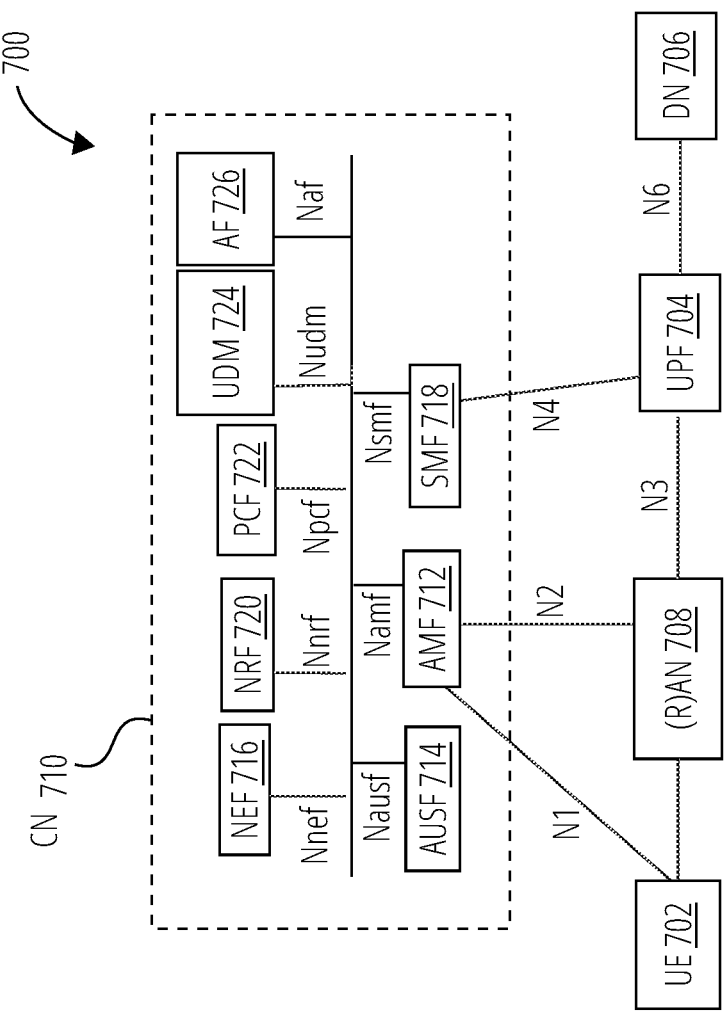
FIG. 7 illustrates a system in accordance with one embodiment.

FIG. 7 illustrates an architecture of a system 700 of a network in accordance with some embodiments. The system 700 is shown to include a UE 702; a 5G access node or RAN node (shown as (R)AN node 708); a User Plane Function (shown as UPF 704); a Data Network (DN 706), which may be, for example, operator services, Internet access or 3rd party services; and a 5G Core Network (5GC) (shown as CN 710).

The CN 710 may include an Authentication Server Function (AUSF 714); a Core Access and Mobility Management Function (AMF 712); a Session Management Function (SMF 718); a Network Exposure Function (NEF 716); a Policy Control Function (PCF 722); a Network Function (NF) Repository Function (NRF 720); a Unified Data Management (UDM 724); and an Application Function (AF 726). The CN 710 may also include other elements that are not shown, such as a Structured Data Storage network function (SDSF), an Unstructured Data Storage network function (UDSF), and the like.

The UPF 704 may act as an anchor point for intra-RAT and inter-RAT mobility, an external PDU session point of interconnect to DN 706, and a branching point to support multi-homed PDU session. The UPF 704 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 704 may include an uplink classifier to support routing traffic flows to a data network. The DN 706 may represent various network operator services, Internet access, or third party services.

The AUSF 714 may store data for authentication of UE 702 and handle authentication related functionality. The AUSF 714 may facilitate a common authentication framework for various access types.

The AMF 712 may be responsible for registration management (e.g., for registering UE 702, etc.), connection management, reachability management, mobility management, and lawful interception of AMF-related events, and access authentication and authorization. AMF 712 may provide transport for SM messages for the SMF 718, and act as a transparent proxy for routing SM messages. AMF 712 may also provide transport for short message service (SMS) messages between UE 702 and an SMS function (SMSF) (not shown by FIG. 7). AMF 712 may act as Security Anchor Function (SEA), which may include interaction with the AUSF 714 and the UE 702, receipt of an intermediate key that was established as a result of the UE 702 authentication process. Where USIM based authentication is used, the AMF 712 may retrieve the security material from the AUSF 714. AMF 712 may also include a Security Context Management (SCM) function, which receives a key from the SEA that it uses to derive access-network specific keys. Furthermore, AMF 712 may be a termination point of RAN CP interface (N2 reference point), a termination point of NAS (N1) signaling, and perform NAS ciphering and integrity protection.

AMF 712 may also support NAS signaling with a UE 702 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (N1) signaling between the UE 702 and AMF 712, and relay uplink and downlink user-plane packets between the UE 702 and UPF 704. The N3IWF also provides mechanisms for IPsec tunnel establishment with the UE 702.

The SMF 718 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 718 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signaling for PDU session authorization/authentication by external DN.

The NEF 716 may provide means for securely exposing the services and capabilities provided by 3GPP network functions for third party, internal exposure/re-exposure, Application Functions (e.g., AF 726), edge computing or fog computing systems, etc. In such embodiments, the NEF 716 may authenticate, authorize, and/or throttle the AFs. NEF 716 may also translate information exchanged with the AF 726 and information exchanged with internal network functions. For example, the NEF 716 may translate between an AF-Service-Identifier and an internal 5GC information. NEF 716 may also receive information from other network functions (NFs) based on exposed capabilities of other network functions. This information may be stored at the NEF 716 as structured data, or at a data storage NF using a standardized interfaces. The stored information can then be re-exposed by the NEF 716 to other NFs and AFs, and/or used for other purposes such as analytics.

The NRF 720 may support service discovery functions, receive NF Discovery Requests from NF instances, and provide the information of the discovered NF instances to the NF instances. NRF 720 also maintains information of available NF instances and their supported services.

The PCF 722 may provide policy rules to control plane function(s) to enforce them, and may also support unified policy framework to govern network behavior. The PCF 722 may also implement a front end (FE) to access subscription information relevant for policy decisions in a UDR of UDM 724.

The UDM 724 may handle subscription-related information to support the network entities' handling of communication sessions, and may store subscription data of UE 702. The UDM 724 may include two parts, an application FE and a User Data Repository (UDR). The UDM may include a UDM FE, which is in charge of processing of credentials, location management, subscription management, and so on. Several different front ends may serve the same user in different transactions. The UDM-FE accesses subscription information stored in the UDR and performs: authentication credential processing; user identification handling; access authorization; registration/mobility management; and subscription management. The UDR may interact with PCF 722. UDM 724 may also support SMS management, wherein an SMS-FE implements the similar application logic as discussed previously.

The AF 726 may provide application influence on traffic routing, access to the Network Capability Exposure (NCE), and interact with the policy framework for policy control. The NCE may be a mechanism that allows the 5GC and AF 726 to provide information to each other via NEF 716, which may be used for edge computing implementations. In such implementations, the network operator and third party services may be hosted close to the UE 702 access point of attachment to achieve an efficient service delivery through the reduced end-to-end latency and load on the transport network. For edge computing implementations, the 5GC may select a UPF 704 close to the UE 702 and execute traffic steering from the UPF 704 to DN 706 via the N6 interface. This may be based on the UE subscription data, UE location, and information provided by the AF 726. In this way, the AF 726 may influence UPF (re)selection and traffic routing. Based on operator deployment, when AF 726 is considered to be a trusted entity, the network operator may permit AF 726 to interact directly with relevant NFs.

As discussed previously, the CN 710 may include an SMSF, which may be responsible for SMS subscription checking and verification, and relaying SM messages to/from the UE 702 to/from other entities, such as an SMS-GMSC/IWMSC/SMS-router. The SMS may also interact with AMF 712 and UDM 724 for notification procedure that the UE 702 is available for SMS transfer (e.g., set a UE not reachable flag, and notifying UDM 724 when UE 702 is available for SMS).

The system 700 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 700 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 710 may include an Nx interface, which is an inter-CN interface between the MME (e.g., MME(s) 1014) and the AMF 712 in order to enable interworking between CN 710 and CN 1006.

Although not shown by FIG. 7, the system 700 may include multiple RAN nodes (such as (R) AN node 708) wherein an Xn interface is defined between two or more (R) AN node 708 (e.g., gNBs and the like) connecting to CN 710, between a (R) AN node 708 (e.g., gNB) connecting to CN 710 and an eNB, and/or between two eNBs connecting to CN 710.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 702 in a connected mode (e.g., CM-CONNECTED) including functionality to manage the UE mobility for connected mode between one or more (R)AN node 708. The mobility support may include context transfer from an old (source) serving (R)AN node 708 to new (target) serving (R)AN node 708; and control of user plane tunnels between old (source) serving (R)AN node 708 to new (target) serving (R)AN node 708.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 8:
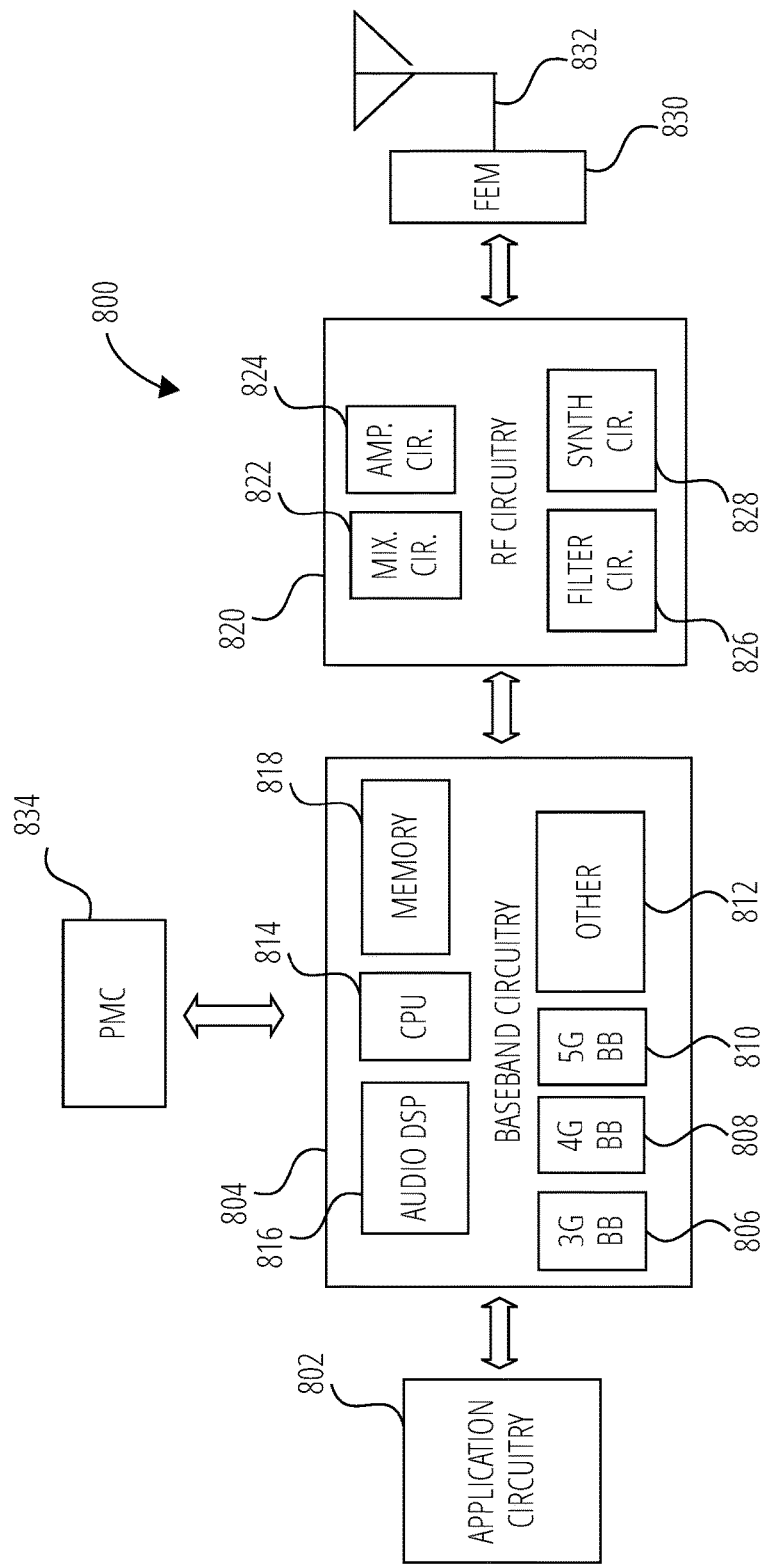
FIG. 8 illustrates a device in accordance with one embodiment.

FIG. 8 illustrates example components of a device 800 in accordance with some embodiments. In some embodiments, the device 800 may include application circuitry 802, baseband circuitry 804, Radio Frequency (RF) circuitry (shown as RF circuitry 820), front-end module (FEM) circuitry (shown as FEM circuitry 830), one or more antennas 832, and power management circuitry (PMC) (shown as PMC 834) coupled together at least as shown. The components of the illustrated device 800 may be included in a UE or a RAN node. In some embodiments, the device 800 may include fewer elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 820 and to generate baseband signals for a transmit signal path of the RF circuitry 820. The baseband circuitry 804 may interface with the application circuitry 802 for generation and processing of the baseband signals and for controlling operations of the RF circuitry 820. For example, in some embodiments, the baseband circuitry 804 may include a third generation (3G) baseband processor (3G baseband processor 806), a fourth generation (4G) baseband processor (4G baseband processor 808), a fifth generation (5G) baseband processor (5G baseband processor 810), or other baseband processor(s) 812 for other existing generations, generations in development or to be developed in the future (e.g., second generation (2G), sixth generation (6G), etc.). The baseband circuitry 804 (e.g., one or more of baseband processors) may handle various radio control functions that enable communication with one or more radio networks via the RF circuitry 820. In other embodiments, some or all of the functionality of the illustrated baseband processors may be included in modules stored in the memory 818 and executed via a Central Processing Unit (CPU 814). The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include a digital signal processor (DSP), such as one or more audio DSP(s) 816. The one or more audio DSP(s) 816 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

The RF circuitry 820 may enable communication with wireless networks using modulated electromagnetic radiation through a non-solid medium. In various embodiments, the RF circuitry 820 may include switches, filters, amplifiers, etc. to facilitate the communication with the wireless network. The RF circuitry 820 may include a receive signal path which may include circuitry to down-convert RF signals received from the FEM circuitry 830 and provide baseband signals to the baseband circuitry 804. The RF circuitry 820 may also include a transmit signal path which may include circuitry to up-convert baseband signals provided by the baseband circuitry 804 and provide RF output signals to the FEM circuitry 830 for transmission.

In some embodiments, the receive signal path of the RF circuitry 820 may include mixer circuitry 822, amplifier circuitry 824 and filter circuitry 826. In some embodiments, the transmit signal path of the RF circuitry 820 may include filter circuitry 826 and mixer circuitry 822. The RF circuitry 820 may also include synthesizer circuitry 828 for synthesizing a frequency for use by the mixer circuitry 822 of the receive signal path and the transmit signal path. In some embodiments, the mixer circuitry 822 of the receive signal path may be configured to down-convert RF signals received from the FEM circuitry 830 based on the synthesized frequency provided by synthesizer circuitry 828. The amplifier circuitry 824 may be configured to amplify the down-converted signals and the filter circuitry 826 may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 822 of the receive signal path may comprise passive mixers, although the scope of the embodiments is not limited in this respect.

In some embodiments, the mixer circuitry 822 of the transmit signal path may be configured to up-convert input baseband signals based on the synthesized frequency provided by the synthesizer circuitry 828 to generate RF output signals for the FEM circuitry 830. The baseband signals may be provided by the baseband circuitry 804 and may be filtered by the filter circuitry 826.

In some embodiments, the mixer circuitry 822 of the receive signal path and the mixer circuitry 822 of the transmit signal path may include two or more mixers and may be arranged for quadrature downconversion and upconversion, respectively. In some embodiments, the mixer circuitry 822 of the receive signal path and the mixer circuitry 822 of the transmit signal path may include two or more mixers and may be arranged for image rejection (e.g., Hartley image rejection). In some embodiments, the mixer circuitry 822 of the receive signal path and the mixer circuitry 822 may be arranged for direct downconversion and direct upconversion, respectively. In some embodiments, the mixer circuitry 822 of the receive signal path and the mixer circuitry 822 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 820 may include analog-to-digital converter (ADC) and digital-to-analog converter (DAC) circuitry and the baseband circuitry 804 may include a digital baseband interface to communicate with the RF circuitry 820.

In some dual-mode embodiments, a separate radio IC circuitry may be provided for processing signals for each spectrum, although the scope of the embodiments is not limited in this respect.

In some embodiments, the synthesizer circuitry 828 may be a fractional-N synthesizer or a fractional N/N+1 synthesizer, although the scope of the embodiments is not limited in this respect as other types of frequency synthesizers may be suitable. For example, synthesizer circuitry 828 may be a delta-sigma synthesizer, a frequency multiplier, or a synthesizer comprising a phase-locked loop with a frequency divider.

The synthesizer circuitry 828 may be configured to synthesize an output frequency for use by the mixer circuitry 822 of the RF circuitry 820 based on a frequency input and a divider control input. In some embodiments, the synthesizer circuitry 828 may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 (such as an applications processor) depending on the desired output frequency. In some embodiments, a divider control input (e.g., N) may be determined from a look-up table based on a channel indicated by the application circuitry 802.

Synthesizer circuitry 828 of the RF circuitry 820 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 828 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 820 may include an IQ/polar converter.

The FEM circuitry 830 may include a receive signal path which may include circuitry configured to operate on RF signals received from one or more antennas 832, amplify the received signals and provide the amplified versions of the received signals to the RF circuitry 820 for further processing. The FEM circuitry 830 may also include a transmit signal path which may include circuitry configured to amplify signals for transmission provided by the RF circuitry 820 for transmission by one or more of the one or more antennas 832. In various embodiments, the amplification through the transmit or receive signal paths may be done solely in the RF circuitry 820, solely in the FEM circuitry 830, or in both the RF circuitry 820 and the FEM circuitry 830.

In some embodiments, the FEM circuitry 830 may include a TX/RX switch to switch between transmit mode and receive mode operation. The FEM circuitry 830 may include a receive signal path and a transmit signal path. The receive signal path of the FEM circuitry 830 may include an LNA to amplify received RF signals and provide the amplified received RF signals as an output (e.g., to the RF circuitry 820). The transmit signal path of the FEM circuitry 830 may include a power amplifier (PA) to amplify input RF signals (e.g., provided by the RF circuitry 820), and one or more filters to generate RF signals for subsequent transmission (e.g., by one or more of the one or more antennas 832).

In some embodiments, the PMC 834 may manage power provided to the baseband circuitry 804. In particular, the PMC 834 may control power-source selection, voltage scaling, battery charging, or DC-to-DC conversion. The PMC 834 may often be included when the device 800 is capable of being powered by a battery, for example, when the device 800 is included in a UE. The PMC 834 may increase the power conversion efficiency while providing desirable implementation size and heat dissipation characteristics.

FIG. 8 shows the PMC 834 coupled only with the baseband circuitry 804. However, in other embodiments, the PMC 834 may be additionally or alternatively coupled with, and perform similar power management operations for, other components such as, but not limited to, the application circuitry 802, the RF circuitry 820, or the FEM circuitry 830.

In some embodiments, the PMC 834 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
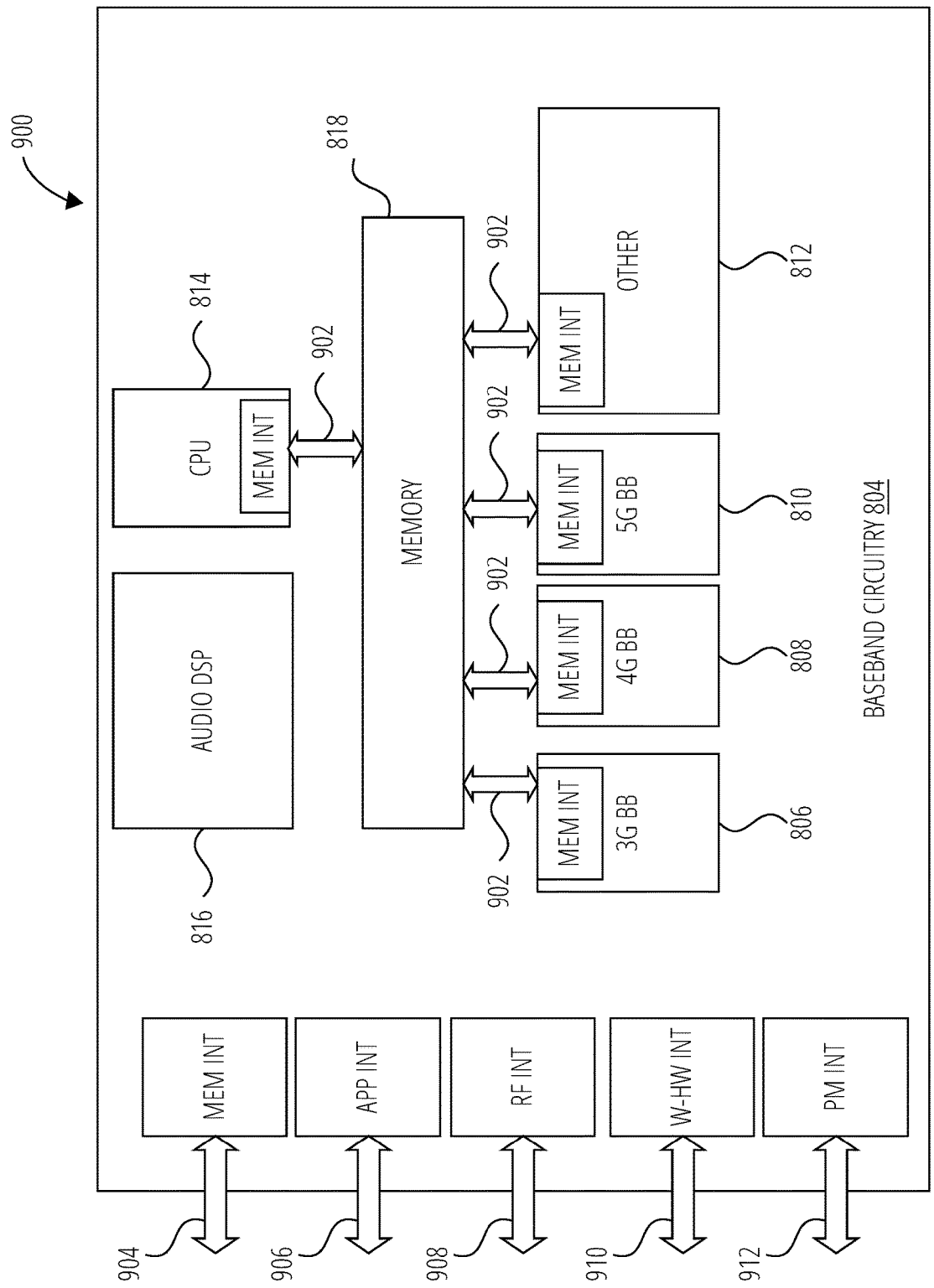
FIG. 9 illustrates example interfaces in accordance with one embodiment.

FIG. 9 illustrates example interfaces 900 of baseband circuitry in accordance with some embodiments. As discussed above, the baseband circuitry 804 of FIG. 8 may comprise 3G baseband processor 806, 4G baseband processor 808, 5G baseband processor 810, other baseband processor(s) 812, CPU 814, and a memory 818 utilized by said processors. As illustrated, each of the processors may include a respective memory interface 902 to send/receive data to/from the memory 818.

The baseband circuitry 804 may further include one or more interfaces to communicatively couple to other circuitries/devices, such as a memory interface 904 (e.g., an interface to send/receive data to/from memory external to the baseband circuitry 804), an application circuitry interface 906 (e.g., an interface to send/receive data to/from the application circuitry 802 of FIG. 8), an RF circuitry interface 908 (e.g., an interface to send/receive data to/from RF circuitry 820 of FIG. 8), a wireless hardware connectivity interface 910 (e.g., an interface to send/receive data to/from Near Field Communication (NFC) components, Bluetooth® components (e.g., Bluetooth® Low Energy), Wi-Fi® components, and other communication components), and a power management interface 912 (e.g., an interface to send/receive power or control signals to/from the PMC 834.

Figure 10:
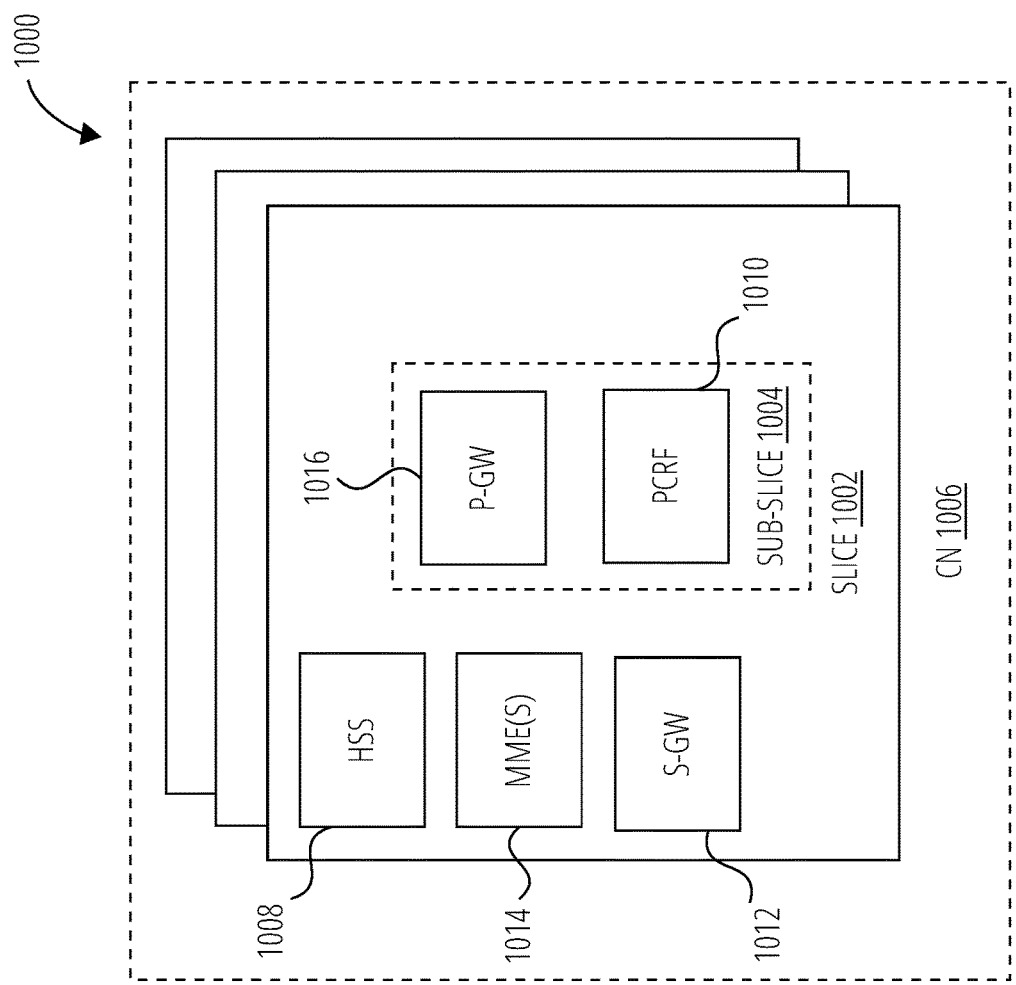
FIG. 10 illustrates components in accordance with one embodiment.

FIG. 10 illustrates components 1000 of a core network in accordance with some embodiments. The components of the CN 1006 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 1006 may be referred to as a network slice 1002 (e.g., the network slice 1002 is shown to include the HSS 1008, the MME(s) 1014, and the S-GW 1012). A logical instantiation of a portion of the CN 1006 may be referred to as a network sub-slice 1004 (e.g., the network sub-slice 1004 is shown to include the P-GW 1016 and the PCRF 1010).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 11:
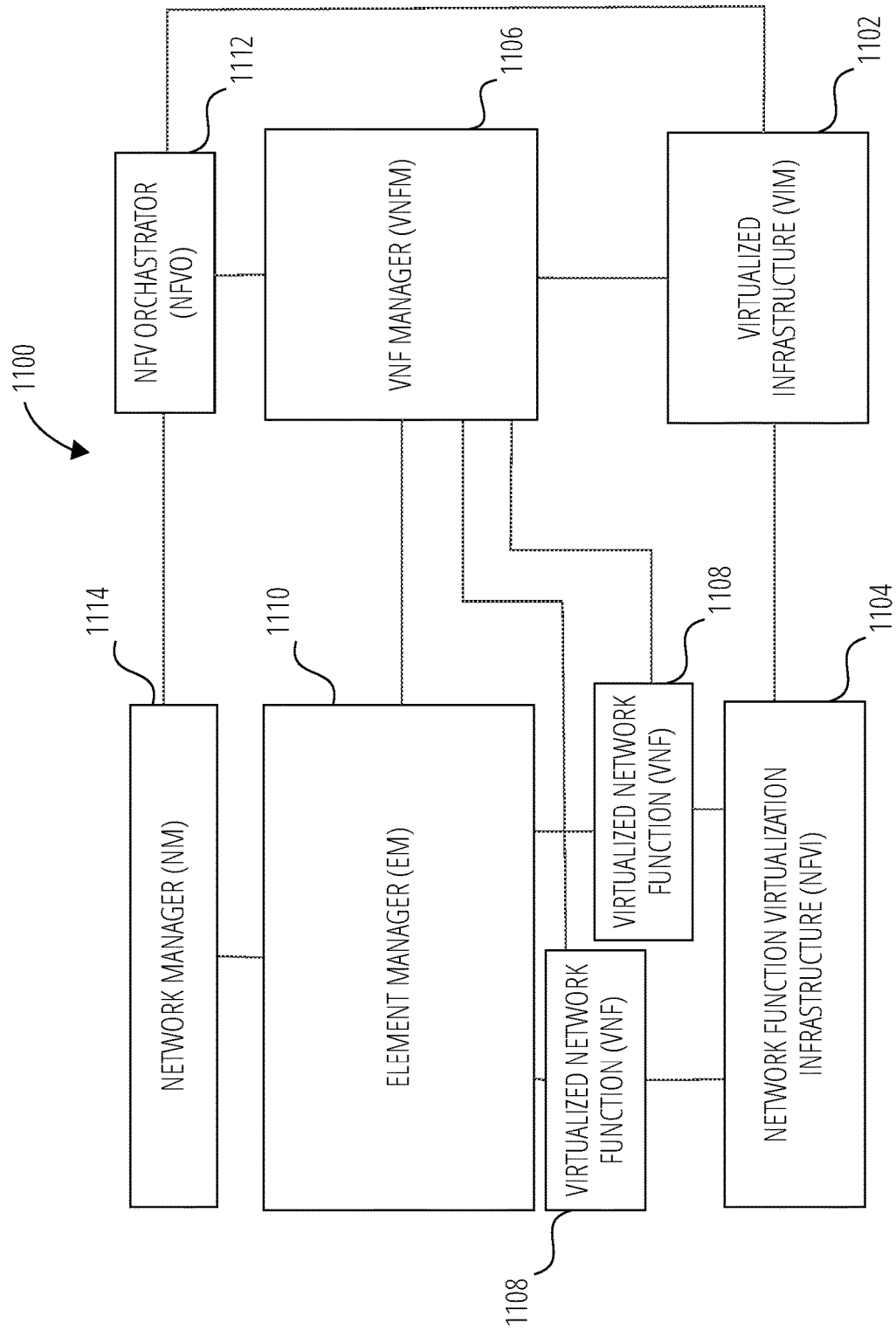
FIG. 11 illustrates a system in accordance with one embodiment.

FIG. 11 is a block diagram illustrating components, according to some example embodiments, of a system 1100 to support NFV. The system 1100 is illustrated as including a virtualized infrastructure manager (shown as VIM 1102), a network function virtualization infrastructure (shown as NFVI 1104), a VNF manager (shown as VNFM 1106), virtualized network functions (shown as VNF 1108), an element manager (shown as EM 1110), an NFV Orchestrator (shown as NFVO 1112), and a network manager (shown as NM 1114).

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1106 may manage the VNF 1108. The VNF 1108 may be used to execute EPC components/functions. The VNFM 1106 may manage the life cycle of the VNF 1108 and track performance, fault and security of the virtual aspects of VNF 1108. The EM 1110 may track the performance, fault and security of the functional aspects of VNF 1108. The tracking data from the VNFM 1106 and the EM 1110 may comprise, for example, performance measurement (PM) data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an EPC function, component, or slice). The NM 1114 may provide a package of end-user functions with the responsibility for the management of a network, which may include network elements with VNFs, non-virtualized network functions, or both (management of the VNFs may occur via the EM 1110).

Figure 12:
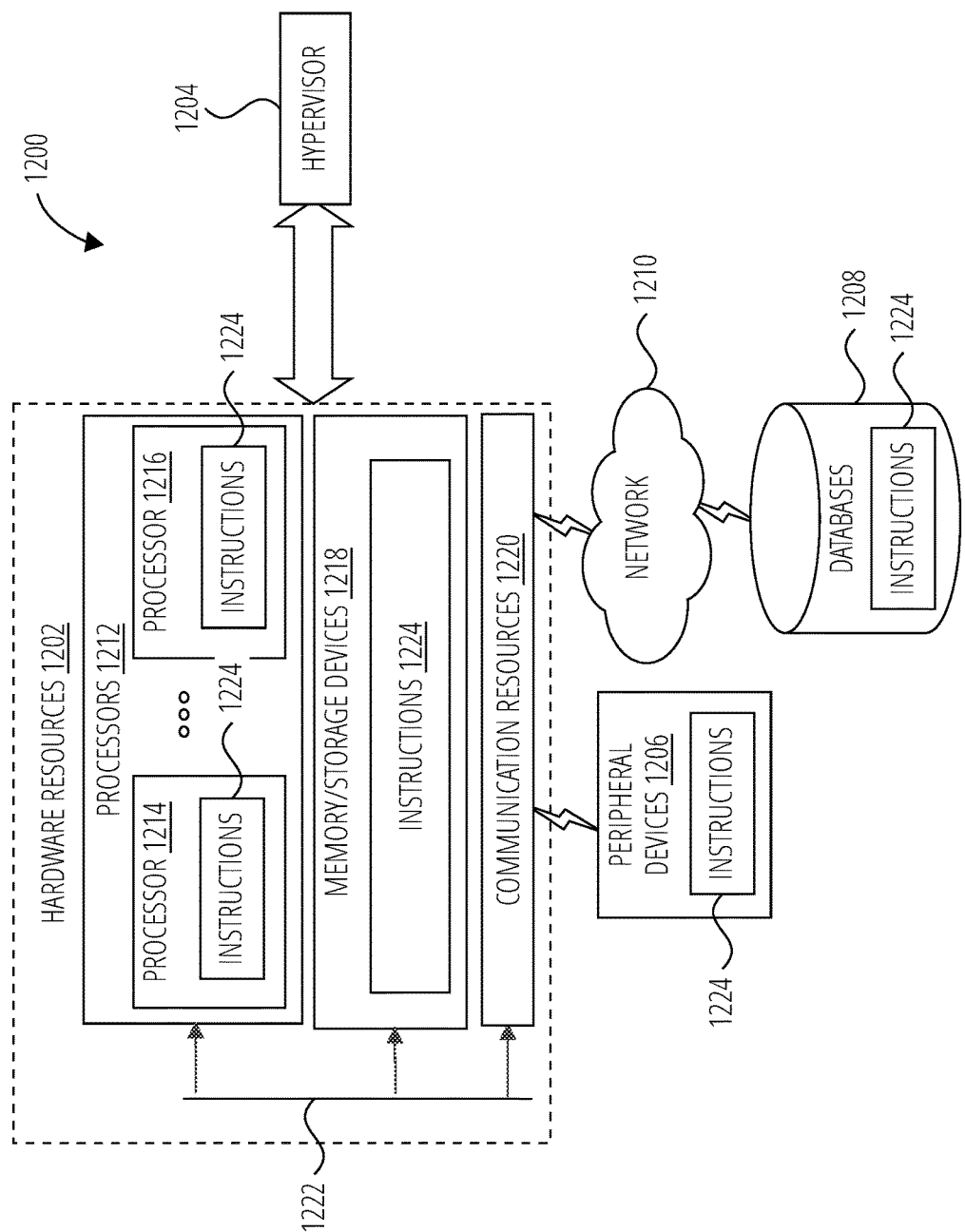
FIG. 12 illustrates components in accordance with one embodiment.

FIG. 12 is a block diagram illustrating components 1200, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1202 including one or more processors 1212 (or processor cores), one or more memory/storage devices 1218, and one or more communication resources 1220, each of which may be communicatively coupled via a bus 1222. For embodiments where node virtualization (e.g., NFV) is utilized, a hypervisor 1204 may be executed to provide an execution environment for one or more network slices/sub-slices to utilize the hardware resources 1202.

The processors 1212 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1214 and a processor 1216.

The memory/storage devices 1218 may include main memory, disk storage, or any suitable combination thereof. The memory/storage devices 1218 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1220 may include interconnection or network interface components or other suitable devices to communicate with one or more peripheral devices 1206 or one or more databases 1208 via a network 1210. For example, the communication resources 1220 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1224 may comprise software, a program, an application, an applet, an app, or other executable code for causing at least any of the processors 1212 to perform any one or more of the methodologies discussed herein. The instructions 1224 may reside, completely or partially, within at least one of the processors 1212 (e.g., within the processor's cache memory), the memory/storage devices 1218, or any suitable combination thereof. Furthermore, any portion of the instructions 1224 may be transferred to the hardware resources 1202 from any combination of the peripheral devices 1206 or the databases 1208. Accordingly, the memory of the processors 1212, the memory/storage devices 1218, the peripheral devices 1206, and the databases 1208 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

E. Example Section

The following examples pertain to further embodiments.

Example 1 is a non-transitory computer-readable storage medium. The computer-readable storage medium includes instructions that when executed by a processor of a management function in a wireless network, cause the processor to: establish a user plane connection with one or more user equipment (UE) in the wireless network; decode uplink (UL) end-to-end (e2e) latency measurement packets from the one or more UE, the UL e2e latency measurement packets comprising data to indicate respective first time stamps when the one or more UE transmitted the UL e2e latency measurement packets; record respective second time stamps corresponding to reception of the UL e2e latency measurement packets from the one or more UE; calculate, based on the first time stamps and the second time stamps, a UL e2e latency for the UL e2e latency measurement packets from the one or more UE; and generate a report message to indicate the UL e2e latency.

Example 2 is the computer-readable storage medium of Example 1, wherein the instructions further configure the processor to encode downlink (DL) e2e latency measurement packets to send to the one or more UE, the DL e2e latency packets indicating respective third time stamps when the management function transmits the DL e2e latency measurement packets to the one or more UE.

Example 3 is the computer-readable storage medium of Example 2, wherein the instructions further configure the processor to report at least one of the first time stamps, the second time stamps, and the third time stamps to a service consumer application.

Example 4 is the computer-readable storage medium of Example 1, wherein to calculate the UL e2e latency comprises to calculate an average UL e2e latency for the UL e2e latency measurement packets from the one or more UE.

Example 5 is the computer-readable storage medium of Example 1, wherein to calculate the UL e2e latency comprises to determine a maximum UL e2e latency for the UL e2e latency measurement packets from the one or more UE.

Example 6 is the computer-readable storage medium of Example 1, wherein to record the second time stamps comprises to generate the second time stamps when the respective UL e2e latency measurement packets arrive at the management function in a data center where a service consumer application is hosted.

Example 7 is an apparatus for a user equipment (UE). The apparatus includes a memory interface and a processor. The memory interface is to send or receive, to or from a memory device, data for downlink (DL) end-to-end (e2e) latency measurement packets. The processor is to: decode the DL e2e latency measurement packets from a management function in a wireless network, the DL e2e latency measurement packets comprising data to indicate respective DL transmit time stamps when the management function transmitted the DL e2e latency measurement packets; record respective receive time stamps corresponding to reception of the DL e2e latency measurement packets at the UE; calculate, based on the DL transmit time stamps and the receive time stamps, a DL e2e latency for the DL e2e latency measurement packets from the management function; and generate a report message to indicate the DL e2e latency to a management system of the wireless network.

Example 8 is the apparatus of Example 7, the processor further configured to: process a request from the management system to send uplink (UL) e2e latency measurement packets to the management function; and in response to the request, generate the UL e2e latency measurement packets including respective UL transmit time stamps corresponding to when the UE transmits the UL e2e latency measurement packets.

Example 9 is the apparatus of Example 8, the processor further configured to report at least one of the DL transmit time stamps, the receive time stamps, and the UL transmit time stamps to a service consumer application.

Example 10 is the apparatus of Example 7, wherein to calculate the DL e2e latency comprises calculating an average DL e2e latency for the DL e2e latency measurement packets from the management function, and wherein to generate the report message comprises including the average DL e2e latency in the report message.

Example 11 is the apparatus of Example 7, wherein to calculate the DL e2e latency comprises to determine a maximum DL e2e latency for the DL e2e latency measurement packets from the management function, and wherein to generate the report message comprises including the maximum DL e2e latency in the report message.

Example 12 is the apparatus of Example 7, wherein to generate the report comprises reporting a separate DL e2e latency for each of the DL e2e latency measurement packets.

Example 13 is a method for a service producer in a wireless network, the method comprising: processing a request from an authorized service consumer to collect performance data for streaming, the request indicating a number of performance data to be reported by streaming; determining whether the number of performance data to be reported reaches a predetermined limit for streaming supported by the service producer; if the number of performance data to be reported reaches or exceeds the predetermined limit, rejecting the request; and if the number of performance data to be reported does not reach or exceed the predetermined limit, creating a measurement job to collect performance data.

Example 14 is the method of Example 13, wherein the request from the authorized service consumer further comprises an indication of a reporting interval, the method further comprising generating a performance data stream comprising measurement results according to the reporting interval.

Example 15 is the method of Example 14, wherein the performance data stream comprises a job identifier corresponding the measurement job.

Example 16 is the method of Example 14, wherein the performance data stream comprises a data collection beginning time corresponding to the measurement job.

Example 17 is the method of Example 14, wherein generating the performance data stream comprises generating a notification carrying measurement results of one or more measured objects for the measurement job.

Example 18 is the method of Example 13, wherein the authorized consumer is authorized for a network function (NF) measurement job control service, and wherein creating the measurement job comprises requesting the NF to collect the performance data.

Example 19 is the method of Example 18, wherein the service producer is located in the NF.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a service producer in a wireless network, the method comprising:
   processing a request from an authorized service consumer to collect performance data for streaming, the request indicating a number of performance data to be reported by the streaming;
   determining whether the number of performance data to be reported reaches a predetermined limit for the streaming supported by the service producer;
   in response to the number of performance data to be reported reaching or exceeding the predetermined limit, rejecting the request; and
   in response to the number of performance data to be reported not reaching or exceeding the predetermined limit, creating a measurement job to collect the performance data.

2. The method of claim 1, wherein the request from the authorized service consumer further comprises an indication of a reporting interval, the method further comprising generating a performance data stream comprising measurement results according to the reporting interval.

3. The method of claim 2, wherein the performance data stream comprises a job identifier corresponding the measurement job.

4. The method of claim 2, wherein the performance data stream comprises a data collection beginning time corresponding to the measurement job.

5. The method of claim 2, wherein generating the performance data stream comprises generating a notification carrying measurement results of one or more measured objects for the measurement job.

6. The method of claim 1, wherein the authorized consumer is authorized for a network function (NF) measurement job control service, and wherein creating the measurement job comprises requesting the NF to collect the performance data.

7. The method of claim 6, wherein the service producer is located in the NF.

8. An apparatus for a service producer in a wireless network, the apparatus comprising:
   a memory device to store performance data; and
   one or more processors configured to:
      process a request from an authorized service consumer to collect the performance data for streaming, the request indicating a number of performance data to be reported by the streaming;
      determine whether the number of performance data to be reported reaches a predetermined limit for the streaming supported by the service producer;
      in response to the number of performance data to be reported reaching or exceeding the predetermined limit, reject the request; and
      in response to the number of performance data to be reported not reaching or exceeding the predetermined limit, create a measurement job to collect the performance data.

9. The apparatus of claim 8, wherein the request from the authorized service consumer further comprises an indication of a reporting interval, the one or more processors further configured to generate a performance data stream comprising measurement results according to the reporting interval.

10. The apparatus of claim 9, wherein the performance data stream comprises a job identifier corresponding the measurement job.

11. The apparatus of claim 9, wherein the performance data stream comprises a data collection beginning time corresponding to the measurement job.

12. The apparatus of claim 9, wherein the one or more processors configured to generate the performance data stream are further configured to generate a notification carrying measurement results of one or more measured objects for the measurement job.

13. The apparatus of claim 8, wherein the authorized consumer is authorized for a network function (NF) measurement job control service, and wherein creating the measurement job comprises requesting the NF to collect the performance data.

14. The apparatus of claim 13, wherein the service producer is located in the NF.

15. A non-transitory computer-readable storage medium, the non-transitory computer-readable storage medium including instructions that when executed by one or more processors of a service producer in a wireless network, cause the one or more processors to:
  process a request from an authorized service consumer to collect performance data for streaming, the request indicating a number of performance data to be reported by the streaming;
  determine whether the number of performance data to be reported reaches a predetermined limit for the streaming supported by the service producer;
  in response to the number of performance data to be reported reaching or exceeding the predetermined limit, reject the request; and
  in response to the number of performance data to be reported not reaching or exceeding the predetermined limit, create a measurement job to collect the performance data.

16. The non-transitory computer-readable storage medium of claim 15, wherein the request from the authorized service consumer further comprises an indication of a reporting interval, the instructions further configured to cause the one or more processors to generate a performance data stream comprising measurement results according to the reporting interval.

17. The non-transitory computer-readable storage medium of claim 16, wherein the performance data stream comprises a job identifier corresponding the measurement job.

18. The non-transitory computer-readable storage medium of claim 16, wherein the performance data stream comprises a data collection beginning time corresponding to the measurement job.

19. The non-transitory computer-readable storage medium of claim 16, wherein the instructions configured to cause the one or more processors to generate the performance data stream are further configured to cause the one or more processors to generate a notification carrying measurement results of one or more measured objects for the measurement job.

20. The non-transitory computer-readable storage medium of claim 15, wherein the authorized consumer is authorized for a network function (NF) measurement job control service, and wherein creating the measurement job comprises requesting the NF to collect the performance data.

\* \* \* \* \*